United States Patent
Ouyang

(10) Patent No.: US 11,425,047 B2
(45) Date of Patent: Aug. 23, 2022

(54) TRAFFIC ANALYSIS METHOD, COMMON SERVICE TRAFFIC ATTRIBUTION METHOD, AND CORRESPONDING COMPUTER SYSTEM

(71) Applicant: HUAWEI TECHNOLOGIES CO., LTD., Guangdong (CN)

(72) Inventor: Chufei Ouyang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 15/930,764

(22) Filed: May 13, 2020

(65) Prior Publication Data

US 2020/0274812 A1 Aug. 27, 2020

Related U.S. Application Data

(63) Continuation of application No. PCT/CN2018/120321, filed on Dec. 11, 2018.

(30) Foreign Application Priority Data

Dec. 15, 2017 (CN) .......................... 201711354592.7

(51) Int. Cl.
*G01R 31/08* (2020.01)
*G06F 11/00* (2006.01)
(Continued)

(52) U.S. Cl.
CPC ............ *H04L 47/22* (2013.01); *G06N 20/00* (2019.01); *H04L 43/062* (2013.01); *H04L 47/2441* (2013.01); *H04L 47/32* (2013.01)

(58) Field of Classification Search
CPC ... H04L 47/22; H04L 43/062; H04L 47/2441; H04L 47/32; H04L 51/38; H04L 51/16;
(Continued)

(56) References Cited

U.S. PATENT DOCUMENTS 7,447,768 B2 * 11/2008 Kelly .................... H04L 43/026
709/224
7,664,048 B1 * 2/2010 Yung ...................... H04L 47/36
370/253

(Continued)

FOREIGN PATENT DOCUMENTS

CN 101505276 A 8/2009
CN 101668035 A 3/2010

(Continued)

OTHER PUBLICATIONS

Blake Anderson et al: "Deciphering Malware"s use of TLS (without Decryption)", Arxiv.org, Cornell University Library, 201 Olin Library Cornell University Ithaca, NY 14853, Jul. 6, 2016(Jul. 6, 2016), XP080712441.

(Continued)

*Primary Examiner* — Stephen M D Agosta
(74) *Attorney, Agent, or Firm* — Womble Bond Dickinson (US) LLP

(57) ABSTRACT

This application provides a traffic analysis method and apparatus, and a computer system. The method includes: obtaining a plaintext feature and a ciphertext feature of a packet in traffic, where the ciphertext feature includes a length feature of an encrypted field in the packet; and analyzing the traffic based on the plaintext feature and the ciphertext feature, to identify a service or an application to which the traffic belongs. The method may be used for service identification or application identification. The ciphertext feature is introduced in traffic analysis, so that traffic identification accuracy is improved in a packet encryption scenario. In addition, this application further provides a common service traffic attribution method and apparatus, and a computer system.

15 Claims, 13 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 47/22* (2022.01)
*G06N 20/00* (2019.01)
*H04L 43/062* (2022.01)
*H04L 47/2441* (2022.01)
*H04L 47/32* (2022.01)

(58) Field of Classification Search
CPC ......... H04L 51/36; H04L 67/04; H04L 51/32; H04L 67/16; G06N 20/00; H04M 1/2755; H04M 1/72445; H04M 2250/12; H04M 1/7243; H04M 1/72412; H04M 1/21; H04N 1/00307; H04N 1/00244; H04N 1/32133; H04N 2201/0082; H04W 4/14; H04W 4/12; H04W 4/18; H04W 4/24; H04W 4/16; H04W 4/70
See application file for complete search history.

(56) References Cited

U.S. PATENT DOCUMENTS

| | | | | |
|---|---|---|---|---|
| 7,778,194 | B1* | 8/2010 | Yung | H04L 47/10 709/224 |
| 8,539,064 | B1* | 9/2013 | Wang | H04L 43/0894 709/224 |
| 9,021,252 | B2 | 4/2015 | Ata et al. | |
| 9,349,134 | B1* | 5/2016 | Adams | G06Q 30/0248 |
| 10,419,454 | B2* | 9/2019 | El-Moussa | H04L 63/1416 |
| 10,657,277 | B2* | 5/2020 | Ray | G06F 21/602 |
| 10,839,077 | B2* | 11/2020 | El-Moussa | G06F 21/566 |
| 10,931,648 | B2* | 2/2021 | Neal | H04L 63/0428 |
| 11,038,906 | B1* | 6/2021 | Bingham | G06N 20/00 |
| 2005/0249125 | A1* | 11/2005 | Yoon | H04L 43/062 370/252 |
| 2006/0137011 | A1* | 6/2006 | Kim | H04L 63/029 726/22 |
| 2006/0172722 | A1* | 8/2006 | Christensen | H04L 47/36 455/410 |
| 2007/0214504 | A1* | 9/2007 | Milani Comparetti | H04L 63/1408 726/23 |
| 2009/0063856 | A1* | 3/2009 | Dunn | H04L 65/601 713/160 |
| 2009/0178061 | A1* | 7/2009 | Sandoval | H04L 67/02 719/328 |
| 2010/0138910 | A1* | 6/2010 | Aldor | H04L 63/0236 726/14 |
| 2010/0145912 | A1* | 6/2010 | Li | H04L 67/104 709/224 |
| 2013/0268656 | A1* | 10/2013 | Bott | H04L 43/0876 709/224 |
| 2014/0066117 | A1* | 3/2014 | Egner | H04W 4/60 455/513 |
| 2014/0269564 | A1* | 9/2014 | Tie | H04W 76/12 370/329 |
| 2015/0215293 | A1* | 7/2015 | Ellison | G06F 21/72 713/171 |
| 2015/0254119 | A1* | 9/2015 | Gallardo | G06F 9/4843 711/166 |
| 2017/0013000 | A1 | 1/2017 | El-Moussa et al. | |
| 2017/0085440 | A1 | 3/2017 | Dosovitsky | |

FOREIGN PATENT DOCUMENTS

| | | |
|---|---|---|
| CN | 102201982 A | 9/2011 |
| CN | 103618792 A | 3/2014 |
| CN | 103873320 A | 6/2014 |
| CN | 104038389 A | 9/2014 |
| CN | 104333461 A | 2/2015 |
| CN | 104348741 A | 2/2015 |
| CN | 105871832 A | 8/2016 |
| WO | 2015165296 A1 | 11/2015 |
| WO | 2016201876 A1 | 12/2016 |

OTHER PUBLICATIONS

Laurent Bernaille et al.: Early Recognition of Encrypted Applications, PAM 2007, LNCS 4427, pp. 165 175, 2007, XP019078570.
Sung-Min Kim et al. A method for service identification of SSL/TLS encrypted traffic with the relation of session ID and Server IP, APNOMS 2015, pp. 487-490.
Yanjie Fu et al. Service Usage Classification with Encrypted Internet Traffic in Mobile Messaging Apps, IEEE Transactions On Mobile Computing, vol. 15, No. 11, Nov. 2016, pp. 2851-2864.
Yanjie Fu et al. Service Usage Analysis in Mobile Messaging Apps: A Multi-label Multi-view Perspective, 2016 IEEE 16th International Conference on Data Mining, pp. 877-882.
Maciej Korczynski et al. Classifying service flows in the encrypted skype traffic, IEEE ICC 2012—Communication and Information Systems Security Symposium, pp. 1064-1068.

* cited by examiner

(a) Request packet

| GET /test/hi-there.txt HTTP/1.1 | Starting row |
| --- | --- |
| Accept: text/* <br> Host: www.joes-hardware.com | Header |

URI

(b) Response packet

| HTTP/1.0 200 OK | Starting row |
| --- | --- |
| Content-type: text/plain <br> Content-length: 19 | Header |
| Hello! I am a piece of information! | Body |

FIG. 2

TRAFFIC ANALYSIS METHOD, COMMON SERVICE TRAFFIC ATTRIBUTION METHOD, AND CORRESPONDING COMPUTER SYSTEM

CROSS-REFERENCE TO RELATED APPLICATIONS

This application is a continuation of International Application No. PCT/CN2018/120321, filed on Dec. 11, 2018, which claims priority to Chinese Patent Application No. 201711354592.7, filed on Dec. 15, 2017. The disclosures of the aforementioned applications are hereby incorporated by reference in their entireties.

TECHNICAL FIELD

This application relates to the field of network traffic analysis, and in particular, to a traffic analysis method, a common service traffic attribution method, a corresponding computer system.

BACKGROUND

As the mobile Internet rapidly develops in recent years, popularity of network traffic increases year by year. To ensure that a network user enjoys a reliable service and to help a network management party manage and monitor activities between network elements in real time, a traffic analysis technology is widely applied to various network devices, including a network transition device or a network packet device, such as a gateway or a router. Currently, an operator provides, by using the technology, information assurance for performing network services such as charging, blocking, and policy control.

One of objectives of traffic analysis is to attribute packets (or data streams) included in traffic to different applications, and this process is referred to as application identification in this application. For example, the operator may need to charge for traffic of a mobile phone application of a user. Therefore, traffic generated when the user uses the application in a time period, namely, traffic that belongs to the application, needs to be calculated. To calculate the traffic, the traffic in the time period first needs to be analyzed to identify a packet that belongs to the application. Based on application identification, the operator can perform distinguished charging to provide a consumer with richer services, and can also monitor a real-time network status to dynamically adjust allocation of network resources of the operator.

However, as Internet Protocol technologies and application program technologies evolve, the traffic analysis technology faces some challenges.

In the prior art, a plaintext feature of a packet is usually used for application identification, and the plaintext feature of the packet is a feature including a character or a digit that can be directly obtained from the packet through parsing. However, with wide use of Internet Protocol encryption technologies, some plaintext features of packets in an original non-encryption protocol are hidden, and only an unhidden feature is used for application identification. Consequently, application identification accuracy is reduced.

In addition, one application may invoke a plurality of services, and the existing traffic analysis technology can be used to distinguish, to some extent, between traffic that belongs to different applications, but is rarely used to perform more fine-grained distinguishing, for example, distinguishing between traffic that belongs to different services (in this application, the distinguishing is referred to as service identification, which is another objective of traffic analysis). Especially after the Internet Protocol encryption technologies are introduced, many original plaintext features of packets are hidden. Consequently, service identification is more difficult.

Further, when a plurality of applications invoke a same service, traffic with a relatively high similarity, namely, common service traffic, is generated. How to identify similar common service traffic and attribute the similar common service traffic to respective applications is currently not resolved in the art.

SUMMARY

The following describes a traffic analysis method, a service identification method and a corresponding apparatus that are provided in this application. It should be understood that the following aspects do not necessarily cover all implementations proposed in this application, and for implementations and benefits of different aspects, mutual reference may be made.

According to a first aspect, this application provides a traffic analysis method. The method is used to improve traffic analysis accuracy in an Internet Protocol encryption scenario, and to specifically improve application identification accuracy or service identification accuracy. The method may be applied to a gateway or another type of network device. The method includes: obtaining a feature of a packet in traffic, where the feature includes a ciphertext feature, and the ciphertext feature includes any one or more of a sequence, a length, and a transmission direction of an encrypted packet; and analyzing the traffic based on the feature, to identify a service or an application to which the traffic belongs.

"Traffic" may be generally one or more data streams. There may be one or more packets whose features are extracted. The "packet" mentioned in this application includes a "data packet" and another type of packet, for example, a packet without data and with only a header.

The "encrypted packet" may be different packets in different encryption manners. This is not limited in this embodiment. The "service" is a function component that is smaller than or equal to an application, and a function provided by the service is usually invoked by the application through an interface. One application may invoke one or more services.

A packet sequence is a location in which a single packet appears in one data stream, or a sequence of a plurality of packets.

A length of a packet may be usually obtained from a field in the packet. If there is no field indicating the packet length, the packet length may be calculated in real time.

A packet transmission direction includes an uplink direction or a downlink direction.

For example, the ciphertext feature may be as follows: A packet length of a first packet A (the packet A is an encrypted packet) in one piece of traffic is m bytes, and a packet length of a second packet A is n bytes; or a length of a first packet A in an uplink direction is m bytes, and a packet length of a second packet A (or another type of packet) in a downlink direction is n bytes; or a first packet A in an uplink direction is an $n^{th}$ packet in the traffic. There may be many feature combination manners that are not enumerated herein one by one.

It can be learned that the method provides a method for efficiently identifying a service or an application in traffic, so as to resolve a problem that a service or an application cannot be identified in an Internet Protocol encryption scenario, and improve identification accuracy by considering a ciphertext feature of a packet in a service identification process or an application identification process.

In some embodiments, the ciphertext feature may be used in combination with a plaintext feature. The plaintext feature includes a feature including a character and/or a digit that can be directly obtained from the packet through parsing. The "feature including a character and/or a digit" mentioned herein includes a single character or a single digit, or may include a character string or another possible combination. During specific engineering implementation, a character type is, for example, char; and a character string type is, for example, string.

In some embodiments, the method is applied to a deep packet inspection (DPI) device. The DPI device may be an independent network device, or may be built in a gateway general packet radio service (GPRS) support node (GGSN). After the method is applied to the DPI device, the DPI device may perform charging by using a policy and charging rules function (PCRF). In some other embodiments, the method is applied to another network traffic parsing device.

In some embodiments, a packet whose plaintext feature is extracted includes a Transport Layer Security (TLS) handshake message (some or all information).

In some embodiments, a packet whose ciphertext feature is extracted includes a data packet such as application data.

In some embodiments, the analyzing the traffic based on the feature, to identify a service or an application to which the traffic belongs includes: performing matching between the feature and a service identification rule or an application identification rule to identify the service or the application to which the traffic belongs. The two identification rules that may be used herein are obtained based on the feature by using a machine learning algorithm. The service identification rule or the application identification rule is obtained through machine learning, so that an entire traffic analysis process is more intelligent, and traffic analysis accuracy is improved.

It should be understood that a packet used when an identification rule is learned by using the machine learning algorithm is not a currently to-be-analyzed packet, and instead, the packet is a packet obtained from history traffic, or a packet obtained from emulation traffic that is obtained by using another method and that has a feature the same as or similar to that of real traffic.

In some embodiments, the traffic may be filtered before traffic analysis. For a filtering method, refer to filtering methods provided in the following aspects.

In some embodiments, after traffic analysis, traffic of various services may continue to be attributed. Refer to traffic attribution methods provided in the following aspects.

According to a second aspect, this application provides a common service traffic attribution method. A common service is a service invoked by two or more applications. Therefore, an application that generates traffic that is identified in traffic analysis and that belongs to a common service invoked by the application needs to be determined. In other words, an application to which the traffic belongs needs to be determined, so that a subsequent operation such as application traffic charging can be supported.

First, a feature of a packet in traffic is obtained. The feature includes a ciphertext feature, and the ciphertext feature includes any one or more of a sequence, a length, and a transmission direction of an encrypted packet. Then the traffic is analyzed based on the feature, to identify a start service, an exclusive service, and a common service in the traffic. An application is determined based on an exclusive service whose identification time is between an identification time of a start service A and an identification time of a start service B. It is determined that traffic of a common service whose identification time is between the identification time of the start service A and the identification time of the start service B belongs to the application. Herein, the start service A and the start service B are any two adjacent services that have a sequence of time at which the services are identified in the traffic (namely, the identification time). In other words, the start service B is a first start service whose identification time is after the identification time of the start service A. The two services may be the same or different. Herein, A and B are used only to distinguish between the two services. For ease of understanding, "first" and "second" may also be used for distinguishing. Herein, "between" may include endpoints.

In some embodiments, the feature further includes a plaintext feature.

In some embodiments, services invoked by an application are classified into three types: the start service, the common service, and the exclusive service. The start service is a service that runs in an application startup phase (not merely an application startup service), for example, a startup service, a login service, or a registration service. The common service is a service that may be invoked by a plurality of applications. Different from the common service, the exclusive service is a service that is invoked by only one application, so that the application can be uniquely determined by using the exclusive service.

It should be understood that the common service and the exclusive service are mutually exclusive, but the start service may be the exclusive service or the common service.

In some embodiments, the "identification time" may not be represented by a real time value during specific implementation, provided that a service identification sequence is recorded.

In some embodiments, a service identification time is not a time at which a service is actually identified, and may be represented by some other digits or other types of information that can be used to identify the service identification sequence.

Because the start service is the service in the application startup phase, a time period may be determined by using identification time of two start services, and traffic generated in the time period belongs to an application to which a previous start service belongs. However, because the start service may also be the common service, the application cannot be determined by using only the start service. Therefore, the application needs to be determined by using an exclusive service in the time period. Because of a feature of the exclusive service, an application corresponding to the exclusive service in the time period is the application to which the previous start service belongs, or an application to which all traffic generated in the time period belongs. Therefore, traffic generated by the common service in the time period certainly belongs to the application. Although the common service is invoked by a plurality of applications, according to the method provided in this application, an application that invokes each identified common service can be determined, in other words, an application to which traffic generated by each identified common service belongs can be determined.

In some embodiments, the traffic may be filtered before traffic analysis. Specifically, in some implementations, a filtering criterion is a maximum quantity of incoming packets, and the maximum quantity of incoming packets is a quantity of packets determined according to an identification rule. Because the identification rule is obtained in advance by using some methods, the maximum quantity of packets required for enabling the identification rule may be obtained directly or through calculation. In some other implementations, the traffic is filtered based on Internet Protocol (IP) information of the traffic. Specifically, an autonomous system number (ASN) domain of a type of application that requires traffic analysis is obtained through calculation by using the IP information, and the traffic is filtered by using the ASN domain. Performing filtering before analysis can reduce a quantity of to-be-analyzed packets and improve traffic analysis efficiency. In addition, the maximum quantity of incoming packets may be adaptively adjusted according to the identification rule, thereby improving filtering flexibility.

In some embodiments, the analyzing the traffic based on the feature, to identify a start service, an exclusive service, and a common service in the traffic includes: performing matching between the feature and each of a first identification rule, a second identification rule, and a third identification rule to identify the start service, the exclusive service, and the common service in the traffic, where the first identification rule, the second identification rule, and the third identification rule are obtained based on the feature by using a machine learning algorithm.

In some embodiments, the first identification rule, the second identification rule, and the third identification rule are identification rules respectively used to identify three services: the start service, the exclusive service, and the common service. The three identification rules are obtained based on a combination of the plaintext feature and the ciphertext feature of the packet by using the machine learning algorithm, before traffic analysis is performed. As described above, the packet herein is derived from history traffic data, or data emulated by using a mathematical method.

In some embodiments, each of the foregoing three identification rules may include a plurality of identification rules for respectively identifying a plurality of services of a same type. In other words, that the first identification rule, the second identification rule, or the third identification rule is only one identification rule is not limited in this application.

In some embodiments, a feature of traffic of an application is extracted (and is used as a sample); the feature is input into the machine learning algorithm (usually a supervised machine learning algorithm); and the three service identification rules are output by using a machine learning process: the first identification rule used to identify a start service, the second identification rule used to identify an application exclusive service, and the third identification rule used to identify a common service. The feature that is input in the machine learning process includes the plaintext feature and/or the ciphertext feature of the packet.

In some embodiments, the machine learning process may be performed offline or online. Service identification rules of a plurality of applications may be simultaneously or separately learned. Optionally, an association relationship between an application and a service rule is established according to a service identification rule learned in a same application.

In some embodiments, in a real-time system, after to-be-analyzed traffic arrives, the three services are distinguished according to the three previously learned service identification rules, and an identification result includes location information of each service (equivalent to a service identification time). Then traffic for a single user is segmented based on a location of a start service; an application to which each segment belongs is determined based on an exclusive service in the segment; and then a common service in each segment is attributed to the application to which each segment belongs. The service location information is used to indicate a service sequence, and may be specifically represented by using the service identification time.

In some embodiments, a correspondence between an exclusive service and an application that invokes the service may be pre-stored in a memory, and the application is determined based on the correspondence information.

According to a third aspect, this application provides another common service traffic attribution method. Compared with the foregoing method, only one of a start service and an exclusive service can be used in the method.

In some embodiments, a feature of a packet in traffic is obtained. The feature includes a ciphertext feature, and the ciphertext feature includes any one or more of a sequence, a length, and a transmission direction of an encrypted packet. The traffic is analyzed based on the feature, to identify an exclusive service and a common service in the traffic. The exclusive service is a service invoked by only one application, and the common service is a service invoked by two or more applications. An application is determined based on an identified exclusive service A, and the application is an application that invokes the exclusive service A. Traffic of a common service whose identification time is between an identification time of the exclusive service A and an identification time of a next identified exclusive service B is attributed to the application. It should be understood that an application that invokes the exclusive service B may be the application that invokes the exclusive service A. Herein, A and B are used only to distinguish between the two services. For ease of understanding, "first" and "second" may also be used for distinguishing. Herein, "between" may include endpoints.

In some other embodiments, the start service is used to replace the exclusive service in the foregoing process.

Any embodiment of the third aspect may be applied to a case in which no other traffic exists between a start service and an exclusive service (a first exclusive service after the start service) in a same application, because the exclusive service is equivalent to a start service.

For another implementation of the third aspect, refer to the embodiment provided in the second aspect, and details are not described herein again. The third aspect and the second aspect may be separately or simultaneously implemented in a product. During simultaneous implementation, it may be first determined whether other traffic exists between the start service and the exclusive service; and if no other traffic exists between the start service and the exclusive service, the method provided in any one of the third aspect or the embodiments of the third aspect is used; or if other traffic exists between the start service and the exclusive service, the method provided in any one of the second aspect or the embodiments of the second aspect is used.

According to a fourth aspect, this application further provides a traffic filtering method, and the method is usually performed before traffic analysis. A service identification rule or an application identification rule (or another type of analysis rule) is used in traffic analysis. In the filtering method, before traffic analysis, a maximum quantity of incoming packets used during traffic analysis is determined by using one or more of these identification rules to be used subsequently, and data packets beyond the quantity are filtered out. For example, all identification rules are related to application data packets (this is only an example of an identification rule). According to a sequence of packets in the traffic, if a last related application data packet is an $n^{th}$ application data packet, an application data packet after the $n^{th}$ application data packet may be filtered out, where n may be used as the maximum quantity of incoming packets. The maximum quantity of incoming packets may be one value, or may be a plurality of values respectively corresponding to different types of data packets.

According to a fifth aspect, this application further provides a traffic filtering method. In the method, an ASN domain is calculated based on IP information in traffic, and then the traffic is filtered by using the ASN domain.

According to a sixth aspect, this application further provides a traffic analysis apparatus, including one or more units, configured to implement any method in the first aspect. In addition, this application further provides a common service traffic attribution apparatus, including one or more units, configured to implement any method in the second aspect or any method in the third aspect. In addition, this application further provides a traffic filtering apparatus, including one or more units, configured to implement any method in the fourth aspect or any method in the fifth aspect.

According to a seventh aspect, this application provides a computer system, including a memory and a processor. The memory is configured to store a computer readable instruction, and the processor is configured to: read the computer readable instruction and implement any one or more methods in the first aspect to the fifth aspect.

According to an eighth aspect, this application further provides a computer readable storage medium. The medium is usually nonvolatile, and the medium is used to store a computer readable instruction. After the computer readable instruction is read by one or more processors, any one or more methods in the first aspect to the fifth aspect are implemented.

"A plurality of" or "a plurality of times" in this application means "at least two" or "at least two times", unless otherwise specified. "First" and "second" in this application are not intended to limit a sequence, but are merely intended to distinguish between two subjects in some description contexts for ease of understanding. However, indicated subjects do not need to be different in all embodiments. "A/B" or "A and/or B" in this application includes three cases: A, B, and both A and B. In this application, "A®" means that A is a trademark name, and a term without "®" may also be a trademark name.

BRIEF DESCRIPTION OF DRAWINGS

To describe the technical solutions provided in this application more clearly, the following briefly describes the accompanying drawings. Apparently, the accompanying drawings in the following descriptions show merely some embodiments of this application.

FIG. 2 shows an example of an HTTP request packet and an HTTP response packet;

DESCRIPTION OF EMBODIMENTS

To help understand the technical solutions proposed in this application, some elements introduced in the descriptions of this application are first described herein. It should be understood that the following descriptions are merely intended to help understand these elements, so as to understand content of the embodiments, but do not necessarily cover all possible cases.

Traffic: Network communication packets are generated when devices connected through a network interact with each other, and these packets are referred to as traffic. The traffic is a general meaning.

Data stream: A data packet generated in a complete communication process (from establishment of a connection to an end of the connection) between a server and a client is referred to as a data stream of the connection. In an application use process, interaction is usually performed for a plurality of times. Therefore, a plurality of data streams are generated to form application traffic.

For example, the data stream is traffic generated during a session starting from TLS handshake establishment and ending with a Transmission Control Protocol (TCP) FIN (finish) packet. The data stream represents a process of interaction between two subjects, for example, interaction between an application process and the server.

Common service: An API (application programming interface) deployed on a server and invoked by a plurality of application programs publicly provides services for completing some functions, for example, map navigation, cloud storage, and video transmission.

Traffic analysis: A network communication packet is obtained through listening, capturing, copying, or the like, and original communication content of the network communication packet is restored through parsing, reassembling, segmentation, or the like, so as to understand instant statuses of two network communication parties.

Plaintext feature: A plaintext feature is a feature including a character and/or a digit that can be directly obtained from a packet through parsing, and is different from a ciphertext feature.

Figure 1:
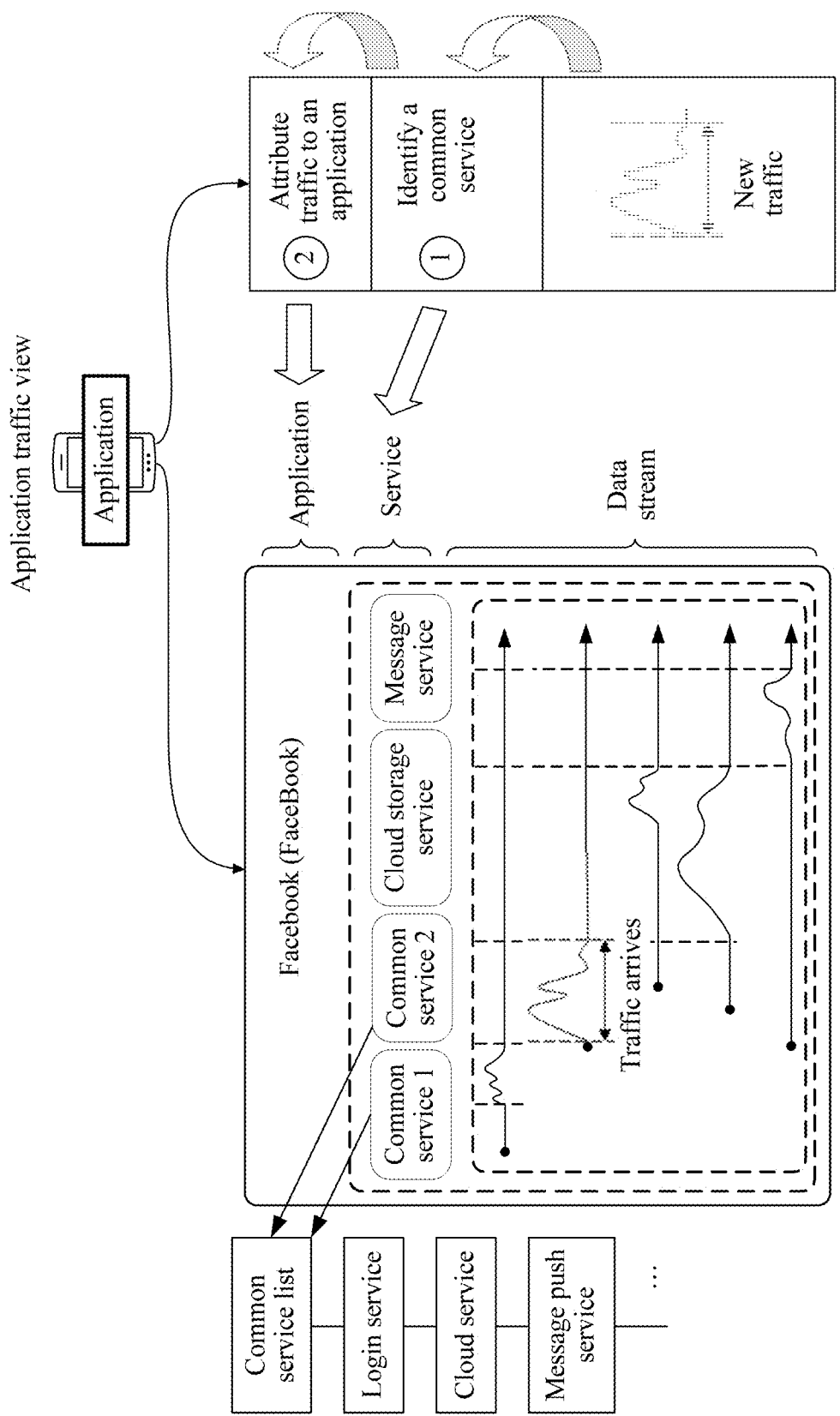
FIG. 1 is a hierarchical schematic diagram of traffic.

FIG. 1 is a schematic diagram of a hierarchical structure of traffic. In FIG. 1, a mobile application Facebook® is used as an example. Traffic of the application may be divided into three layers in a hierarchical structure. A first layer is a data stream layer, to be specific, traffic generated during a session starting from TLS handshake establishment and ending with a TCP FIN packet. The data stream layer indicates interaction between an application process and a server. A second layer is a service layer, to be specific, a submodule that interacts with the server in the application. All traffic generated when a process corresponding to the service layer interacts with the server is traffic of the service module, such as a cloud storage service or a message service of Facebook®. A third layer is an application layer, to be specific, the application program Facebook®. Facebook® further includes common services, such as a login service, a cloud service, and a message push service. The common services in Facebook® may be invoked by other application programs. It means that traffic belonging to the common services does not necessarily all belong to Facebook®. After new traffic arrives and after a traffic analysis module identifies a common service, the traffic analysis module further needs to attribute, by using a specific method, traffic of the common service to an application program to which the traffic should be attributed. In this way, the traffic of the application program can be accurately calculated.

Currently, a traffic identification technology mainly focuses on traffic identification at the application layer, and traffic identification at the service layer is basically not performed. However, common service traffic in the application market currently occupies at least 60% of total traffic, and a quantity of applications using a common service module occupies at least 95% of a total quantity. A most prominent service identification problem is Google®-type service identification. For example, a conflict of identifying common service traffic, such as Google® map traffic, occurs for all application programs using a Google® map service. Consequently, a service of an operator is seriously affected. However, in actual application, a service cannot be accurately identified by using an application-layer traffic identification technology, and consequently a relatively high false identification rate is generated.

An existing widely-used traffic analysis solution is a plaintext feature identification method in which traffic is identified by using a plaintext feature of a Hypertext Transfer Protocol (HTTP) packet and a plaintext feature of a TLS handshake message. The HTTP packet includes a request packet and a response packet. FIG. 2 shows an example of an HTTP request packet (a) and an HTTP response packet (b). The HTTP packet includes three parts: a starting row, a message header, and a body. Table 1 shows a possible action of the starting row.

TABLE 1

| Action | Meaning |
|---|---|
| GET | Request to obtain a resource identified by a URI. |
| POST | Add new data after a resource identified by a URI. |
| HEAD | Request to obtain a response message header of a resource identified by a URI. |

TABLE 1-continued

| Action | Meaning |
|---|---|
| PUT | Request a server to store a resource and use a URI as an identifier of the resource. |
| DELETE | Request a server to delete a resource identified by a URI. |
| TRACE | Request a server to return received request information mainly for testing or diagnosis. |
| CONNECT | Reserved for future use. |
| OPTIONS | Request to query performance of a server, or query an option and a requirement that are related to a resource. |

In traffic analysis, interaction behavior being performed between the client and the server side may be determined through the foregoing actions. For example, interaction content may be determined by using the resource identified by the uniform resource identifier (URI), and a host field in a header field may be used to determine whether the packet belongs to an application. Therefore, in a plaintext feature analysis technology, these character or digital features that can be parsed are usually directly used to speculate statuses of two network communication parties. Subsequently, after an encryption technology is introduced in a network communication protocol, only a small part of unencrypted traffic can continue to use the plaintext feature analysis technology.

Figure 3:
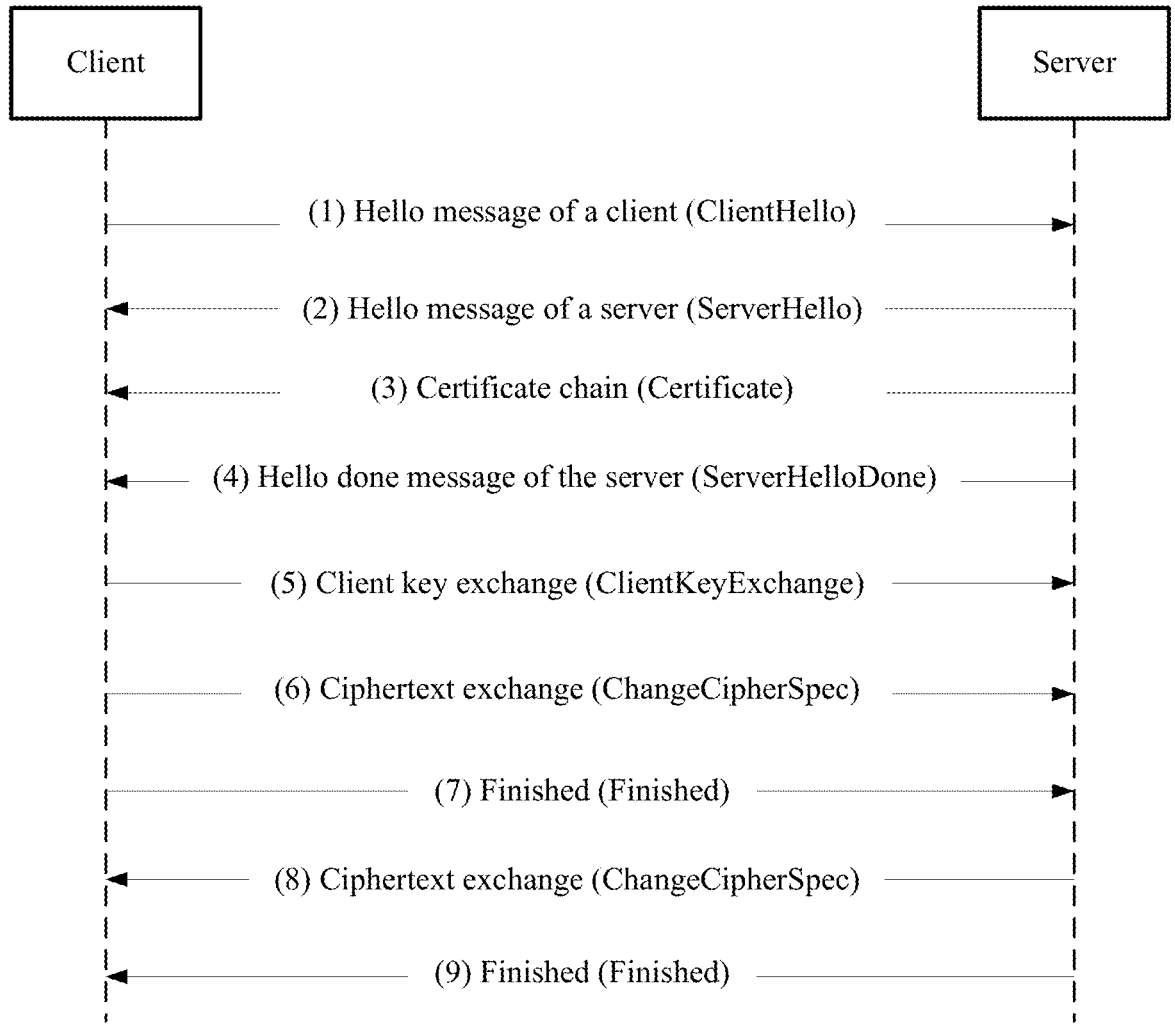
FIG. 3 is a schematic diagram of a TLS handshake process.

Due to application of the protocol encryption technology, all plaintext feature fields of an original HTTP packet are encrypted into Hypertext Transfer Protocol Secure (HTTPS)-based fields. At least 90% of current network traffic is based on the HTTPS protocol. A structure of the HTTPS protocol is that a TLS protocol layer is encapsulated on the original HTTP packet. A handshake process of the TLS protocol is shown in FIG. 3, and is similar to a three-way handshake process of the TCP protocol. As shown in FIG. 3, a TLS protocol client first sends ClientHello to the server; the server returns ServerHello and a certificate; the client receives the certificate, generates a public key for encryption, and sends the public key and an encryption algorithm to the server; and a handshake process ends after confirmation by the server. Then the two parties start to send an encrypted application data packet. When protocol encryption is performed, a plaintext feature includes a feature of a TLS handshake message, and a ciphertext feature includes a feature of encrypted application data. In the prior art, only a plaintext feature in traffic is used to perform application identification.

TLS handshake messages mainly include 10 basic types (and other extended types). A feature of a TLS handshake message is constructed below mainly based on one or more of the 10 types of packets. The 10 types of packets include (1) to (5), and (7) (equivalent to (9)) that are shown in FIG. 3, and further include HelloRequest, ServerKeyExchange, CertificateRequest, and CertificateVerify that are not shown in FIG. 3. The following briefly describes the 10 types of packets in Table 2. Some of the packets in Table 2 are required by the server or the client, and are not mandatory in all scenarios.

TABLE 2

| Packet type | Meaning or function |
| --- | --- |
| HelloRequest | Handshake actively initiated by a server. This is not common and is mainly used in the following case: A session has lasted for a long time, and the server reestablishes a new connection to a client to reduce security risks. |
| ClientHello | Hello message sent by a client to a server, including a session ID. |
| ServerHello | Hello message sent by a server to a client, including an encryption algorithm and a compression algorithm that are selected by the server. |
| Certificate | Certificate chain sent by a server to a client. |
| ServerKeyExchange | Message received by a client from a server, carrying a parameter for establishing symmetric encryption. The parameter is optional and is not required in all key exchange algorithms. |
| CertificateRequest | A server requests a client to provide a certificate. This is not common in a web server. |
| ServerHelloDone | Hello done message. |
| ClientKeyExchange | Responsible for sending the following three pieces of information to a server: a random number: The random number is encrypted by using a public key of the server, to prevent eavesdropping; a code change notification: indicating that subsequent information is sent by using an encryption method and a key that are negotiated by both parties; and a client handshake end notification: indicating that a handshake phase of a client ends. The notification is also a hash value of all previously sent content, and is used for verification by the server. |
| Certificate Verify | A client needs to verify whether a certificate of a server is issued by a trusted authority, whether a domain name in the certificate is consistent with an actual domain name, or whether the certificate expires. If verification on the certificate succeeds, the client fetches a public key of the server from the certificate of the server. |
| Finished | When this message is sent, the message is already encrypted, because negotiation has ended, a ChangeCipherSpec message has been sent, and encrypted communication between two parties has been activated. |

It should be noted that the ChangeCipherSpec protocol is not a part of a handshake protocol, and sending the ChangeCipherSpec protocol indicates that encryption statuses of the two parties are ready. In subsequent communication, ciphertext encryption communication negotiated by the two parties is used, and details are not described in this application. In addition, the Finished packet herein indicates that a handshake process ends, and is not the foregoing TCP FIN packet. A communication process between the client and the server is actually as follows: A TCP handshake is first established at the TCP layer; then the TLS handshake message shown in FIG. 3 is transmitted by using the TCP protocol; then a service packet is transmitted; and finally current interaction ends by using the TCP FIN packet.

In an existing solution, one or more of the foregoing TLS handshake messages may be used to construct features, the features are converted into machine-readable rules, such as XML (extensible markup language), and the rules are stored. After network traffic is parsed, these rules are read for traffic filtering in a corresponding protocol format. A filtering manner may be sequential filtering. A full matching rule starting from the ClientHello packet and ending with the Finish packet is established (that is, all plaintext fields in the packet are input). After filtering is completed, traffic obtained after filtering is sent to a service logic matching module, an application to which the traffic belongs is identified based on an application ID corresponding to the rule, and a matching result is output.

However, for some applications of a same type, because the applications of the same type are relatively highly similar in terms of some features (such as certificates), the applications cannot be distinguished when a rule is established by using only the features of the foregoing TLS handshake messages. In addition, traffic of different services in a same application cannot be identified by using only the features of the foregoing TLS handshake messages. In particular, common traffic generated when different applications use a same service is identified as traffic of a single application. Especially when a nested service exists inside the service, a large amount of false identification is generated. These current plaintext features cannot be used to subdivide service traffic. When common service traffic is generated, identification cannot be completed. Therefore, after a common service occurs, statistics about common traffic of a next application or a previous application is usually collected to a current application during traffic statistics collection. Consequently, a false identification rate is relatively high.

Herein, applications of a same type are applications that invoke a same or similar service. Because the server issues a same type of certificate to a same type of service, identification cannot be performed by using only the TLS handshake messages. The applications of the same type may be applications comprising a same service, for example, two map applications of a same company or different companies; or may be applications that are of different types of a same company and that invoke a same service.

Figure 4:
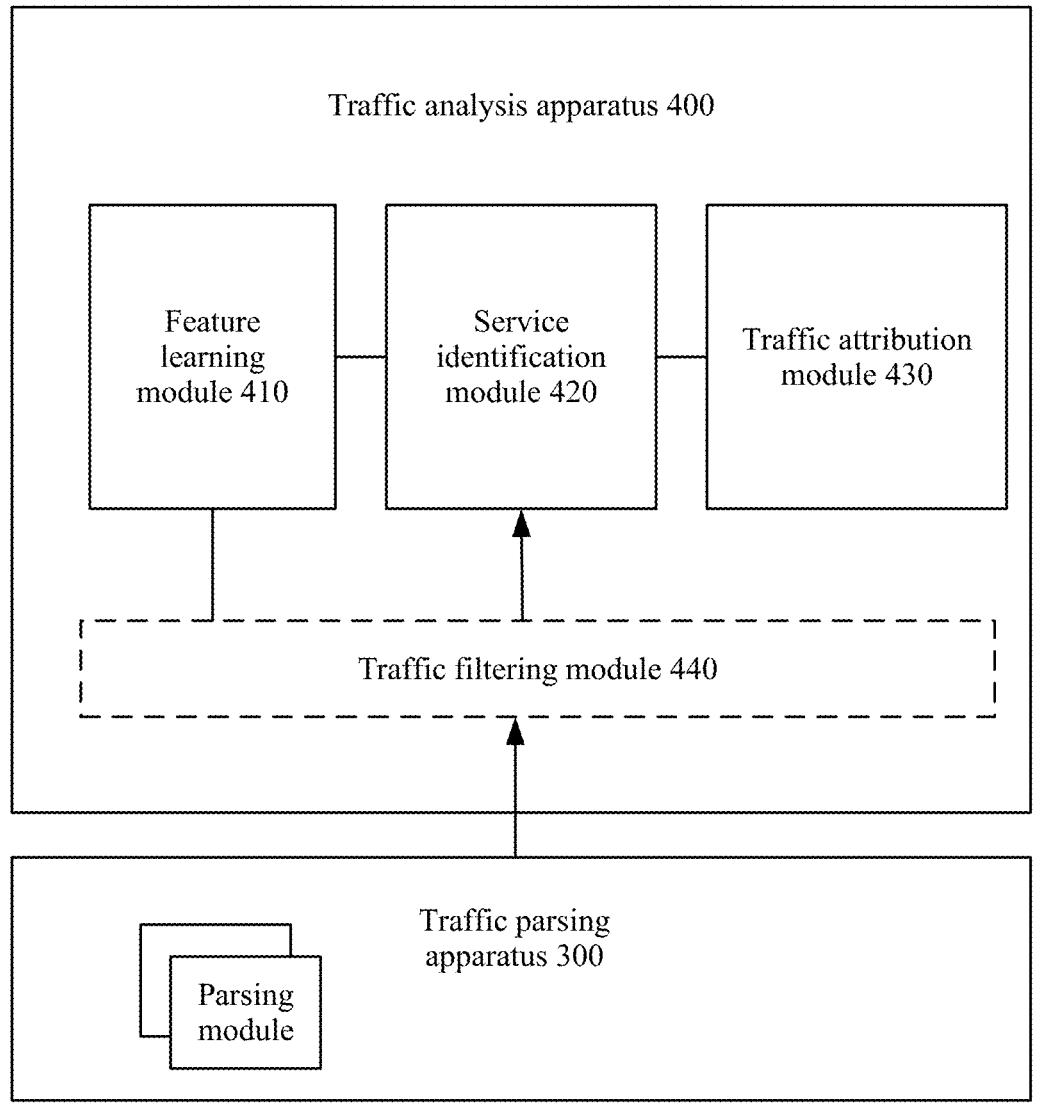
FIG. 4 is a schematic diagram of a logical structure of a traffic analysis apparatus according to an embodiment of this application.

FIG. 4 is a schematic diagram of a logical structure of a traffic analysis apparatus 400 according to an embodiment. The apparatus includes a feature learning module 410, a service identification module 420, and a traffic attribution module 430.

Further, the traffic analysis apparatus may be connected to a traffic parsing apparatus 300. The traffic parsing apparatus 300 is configured to: parse received traffic, and then output a result obtained through parsing to the traffic analysis apparatus 400. In a traffic parsing process, range information of a field is extracted (specifically extracted by a parsing module in FIG. 4) step by step according to a protocol format. Specifically, the prior art may be used, and details are not described in this embodiment.

Further, the traffic analysis apparatus 400 may include a traffic filtering module 440, configured to: filter, according to all or some of rules obtained by the feature learning module 410, the result that is output by the traffic parsing apparatus 300; and input, to the service identification module 420, traffic obtained through filtering, so as to reduce an amount of processing by the service identification module 420 and improve processing efficiency. The parsing process may be further implemented in combination with hardware. For example, the parsing process is accelerated in combination with a hardware acceleration apparatus.

A plurality of modules in FIG. 4 may be deployed on a same physical machine, or may be deployed on different physical machines.

The traffic analysis apparatus 400 is used as an example. The following describes a traffic analysis method provided in this application. The traffic analysis method belongs to some or all functions provided by the traffic analysis apparatus 400.

Figure 5:
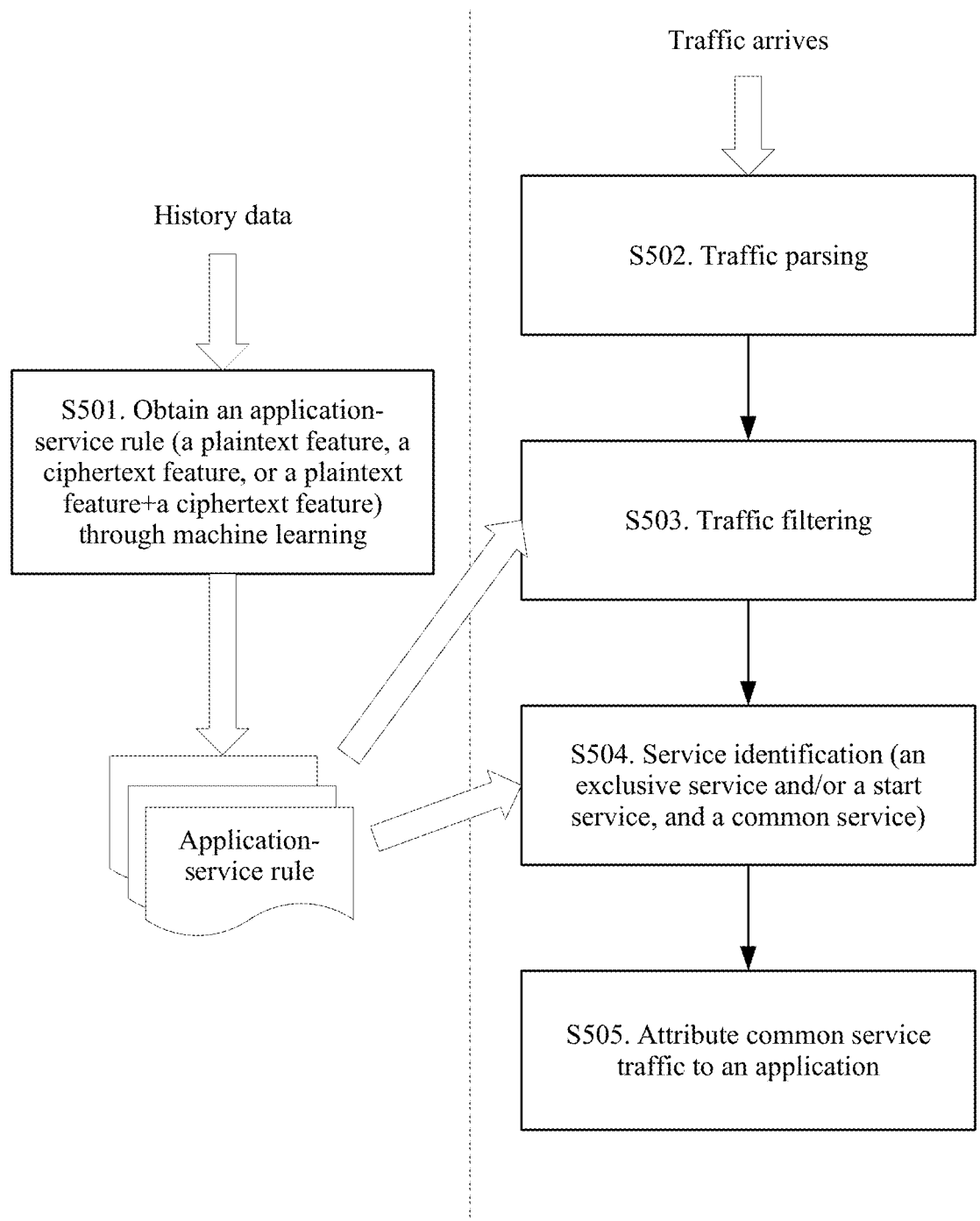
FIG. 5 is a schematic flowchart of a traffic analysis method according to an embodiment of this application.

FIG. 5 is a schematic flowchart of a traffic analysis method according to an embodiment.

S501. A feature learning module 410 performs machine learning based on collected history traffic data or traffic data obtained in another manner, and obtains an application-service rule of each application through machine learning.

In a machine learning process, a feature of a packet needs to be extracted. The feature of the packet herein includes either or both of a plaintext feature and a ciphertext feature of the packet. The plaintext feature includes a feature including a character and/or a digit that can be directly obtained from the packet through parsing. The ciphertext feature includes any one or more of a sequence, a length, and a transmission direction of an encrypted packet.

An application-service rule of an application includes identification rules of three services invoked by the application. The three services include a start service, an application exclusive service, and a common service. The application-service rule is used to perform service identification. In addition, because the three rules are associated with a specific application, an application to which identified traffic belongs may be learned according to the rules. Start services and common services of two or more different applications may be partially or completely the same, so that identification rules obtained through learning may be partially repeated.

The machine learning process may be performed offline, in other words, not in real time; or may be performed in real time. Some traffic data may be periodically obtained when the machine learning process is performed in real time, and an application-service rule is generated or updated through machine learning.

In some other embodiments, a manager may manage, by using a management configuration module (not shown in the figure), the rules obtained by the feature learning module 410. For example, the manager may add, delete, modify, or view these rules.

S502. After traffic arrives, a traffic parsing apparatus 300 reads a packet in the traffic from a storage (for example, a memory), parses the packet according to a protocol format of the packet, and transmits, to a traffic filtering module 440, a packet (or referred to as traffic) obtained through parsing.

A protocol above a transport layer, namely, a TCP/IP layer, is used in a parsing process, for example, the TLS protocol. A TLS protocol-based packet may be divided into a TLS handshake part and a TLS record part according to a format. In this embodiment, the handshake part mainly includes seven types of data packets, including ClientHello, ServerHello, Certificate, and the like. As mentioned above, not all the 10 types of data packets are used.

S503. The traffic filtering module 440 receives the traffic from the traffic parsing apparatus 300, obtains the application-service rule from the feature learning module 410, filters a received packet according to the application-service rule, and sends, to a service identification module 420, a packet obtained through filtering.

In one embodiment, the feature learning module 410 stores the application-service rule in the memory by using a file or in another form. After reading the application-service rule from the memory, the traffic filtering module 440 filters the traffic according to the application-service rule.

The traffic filtering module 440 is mainly configured to preprocess the traffic before service identification, such as filtering or offloading, so as to reduce system overheads and improve processing efficiency of the service identification module 420. The traffic filtering module 440 can support performing parsing based on different fields in different packets such as HTTP and TLS packets, and can also support a custom regular filter mode.

In some other embodiments, the traffic filtering module 440 may not be required.

S504. The service identification module 420 receives, from the traffic filtering module 440, the traffic obtained through filtering, obtains the application-service rule from the feature learning module 410, performs, according to the application-service rule, service identification on the traffic obtained through filtering, and obtains an identification result. The identification result includes a "location" of each service and a type of a service to which the traffic belongs: a start service, an application exclusive service, or a common service. Finally, the identification result is sent to a traffic attribution module 430.

The "location" of the service herein does not mean a geographical location. Location information of a service can be understood as a mark or an indication, and is used to indicate a sequence of a time for identifying the service relative to another service. For example, the location information of the service may be a time point at which the service is identified, or a digit that may reflect a sequence.

For example, if it is determined that a feature of a data stream S1 matches a feature of a start service of an application, traffic of the data stream S1 belongs to the start service, and then a correspondence between the data stream S1, a start service, and a service location is recorded in the memory.

S505. The traffic attribution module 430 receives the identification result sent by the service identification module 420, and determines, based on a start service and an exclusive service (or based only on the exclusive service), an application to which traffic of a common service belongs.

In one embodiment, the service identification module 420 records the identification result in the memory, and the memory may be a cache, or may be another type of memory. Then the traffic attribution module 430 reads the identification result from the memory.

In one embodiment, an application identification time (that is, a location of a start service) does not need to be considered. When an exclusive service is identified, an application (for example, an application ID) corresponding to the exclusive service is recorded in the memory, and traffic of a common service that appears after the time point belongs to the application. When a next exclusive service is subsequently identified, a new application (which may be the same as the previous application because a same application may have two or more exclusive services) is recorded. This method is applicable to a scenario in which there is no traffic between a start service and an exclusive service, and the exclusive service is equivalent to a start service.

In one embodiment, a start service is first identified, an application identification time is determined, and the identification time is stored in the memory. It should be noted that the "time" herein is not necessarily a time value. When an exclusive service is identified, an application corresponding to the exclusive service is recorded in the memory, and traffic of a common service that appears after the time point belongs to the application. After a next start service is subsequently identified, updating the application recorded in the memory is considered.

In the foregoing two embodiments, to save storage space of the memory, an aging time of stored content, a quantity of stored content entries, or the like may be set during implementation of the method.

The following uses the second embodiment as an example for description. There is only a slight difference between the first implementation and the second implementation. With reference to the second implementation, a person skilled in the art may learn how to implement the first implementation.

First, currently received traffic is segmented based on location information of all identified start services. For example, a first segment ranges from a start service $SS_a$ to a start service $SS_b$, and a second segment ranges from the start service $SS_b$ to a start service $SS_c$.

Then an application corresponding to a segment is determined based on location information of an exclusive service. For example, if an exclusive service $OS_b$ is in the second segment, and the exclusive service $OS_b$ is exclusive to an application B, it is determined that the second segment corresponds to the application B. It should be understood that segments and applications are not in a one-to-one correspondence. The second segment corresponds to the application B, but it does not mean that traffic of the application B exists only in the second segment. The application B may be started for a plurality of times.

Finally, an application to which the common service belongs is determined based on the location information of the common service and the application corresponding to the segment. For example, if a common service $PS_a$ is in the second segment, and it is learned that the second segment corresponds to the application B, traffic of the common service $PS_a$ belongs to the application B.

S502 to S505 are usually a real-time processing process.

Figure 6:
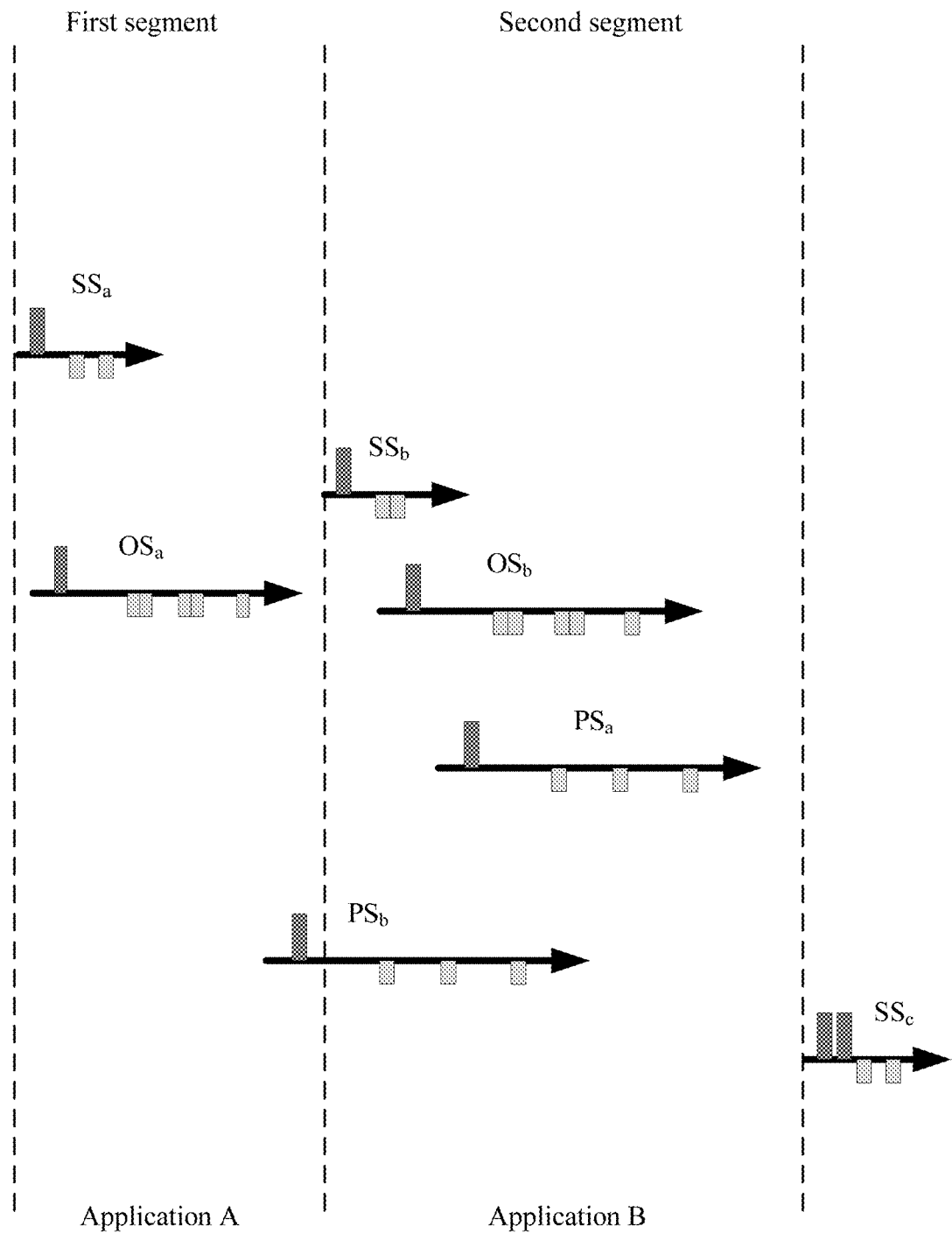
FIG. 6 is a schematic principle diagram of a traffic attribution method according to an embodiment of this application.

For ease of understanding, FIG. 6 is a schematic diagram illustrating a process of attributing common service traffic. In the figure, an arrow is used to represent a data stream, and also represent a service. A service location is a start location of the arrow. Blocks on the arrow represent an uplink packet and a downlink packet, and a plurality of blocks are combined to form different packet features. As shown in FIG. 6, it is assumed that three start services $SS_a$, $SS_b$, and $SS_c$, two exclusive services $OS_a$ and $OS_b$, and two common services $PS_a$ and $PS_b$ have been identified in step S504.

The exclusive service $OS_b$ exists after the start service $SS_b$ and before a next start service $SS_c$, and it is learned that $OS_b$ is exclusive to the application B. Therefore, it may be determined that the start service $SS_b$ is a start service of the application B. Further, it may be determined that a start time of the application B is approximately a time indicated by a location of the start service $SS_b$. Likewise, the exclusive service $OS_a$ is exclusive to an application A. Therefore, it may be determined that the start service $SS_a$ is a start service of the application A.

The common service $PS_a$ is in the second segment, and appears after the application B is started. Therefore, traffic of the common service $PS_a$ should belong to the application B. However, although arrival time points of most data streams of the other common service $PS_b$ coincide with the second segment, it is learned from the figure that an initial location (a location at which the common service is identified) of the other common service $PS_b$ is in the first segment. However, the application B has not been started in this case. Therefore, the traffic of $PS_b$ belongs to the application A instead of the application B.

It should be noted that a time at which a service is identified (that is, a time indicated by a location of the service) is not an exact time at which the application is started or the service is started. However, a sequence in which services are identified is usually consistent with a sequence in which the services run.

The solutions are collectively described above. The following uses a Google® application (for example, Google Map) as an example to describe a service identification method and a service traffic attribution method in detail, and the foregoing steps are specifically implemented. In a current technology, accuracy of identifying traffic of the Google® application is relatively low, and attribution of common service traffic cannot be correctly determined, thereby affecting a normal traffic identification service of an operator. Therefore, in this application, the Google® application is used as an example to describe a traffic analysis method.

An objective of the method to be described below is to determine attribution of traffic of a Google common service, so as to improve traffic identification accuracy of the Google® application.

A general process of the method is similar to that in FIG. 5, and includes the following: First, an application-service rule is obtained by using a technology of constructing a feature of encrypted traffic and a feature learning technology. The application-service rule specifically includes three types of rules: a first identification rule used to identify a start service, a second identification rule used to identify an exclusive service, and a third identification rule used to identify a common service (for a specific rule learning process, refer to the following descriptions). Then an application-service rule filtering technology is used to reduce to-be-matched traffic, dynamically set a quantity of incoming packets, and the like, so as to reduce system performance overheads. Then the three types of services are identified by using the application-service rule, and an application to which a common service belongs is determined based on locations of the different types of services.

Figure 7:
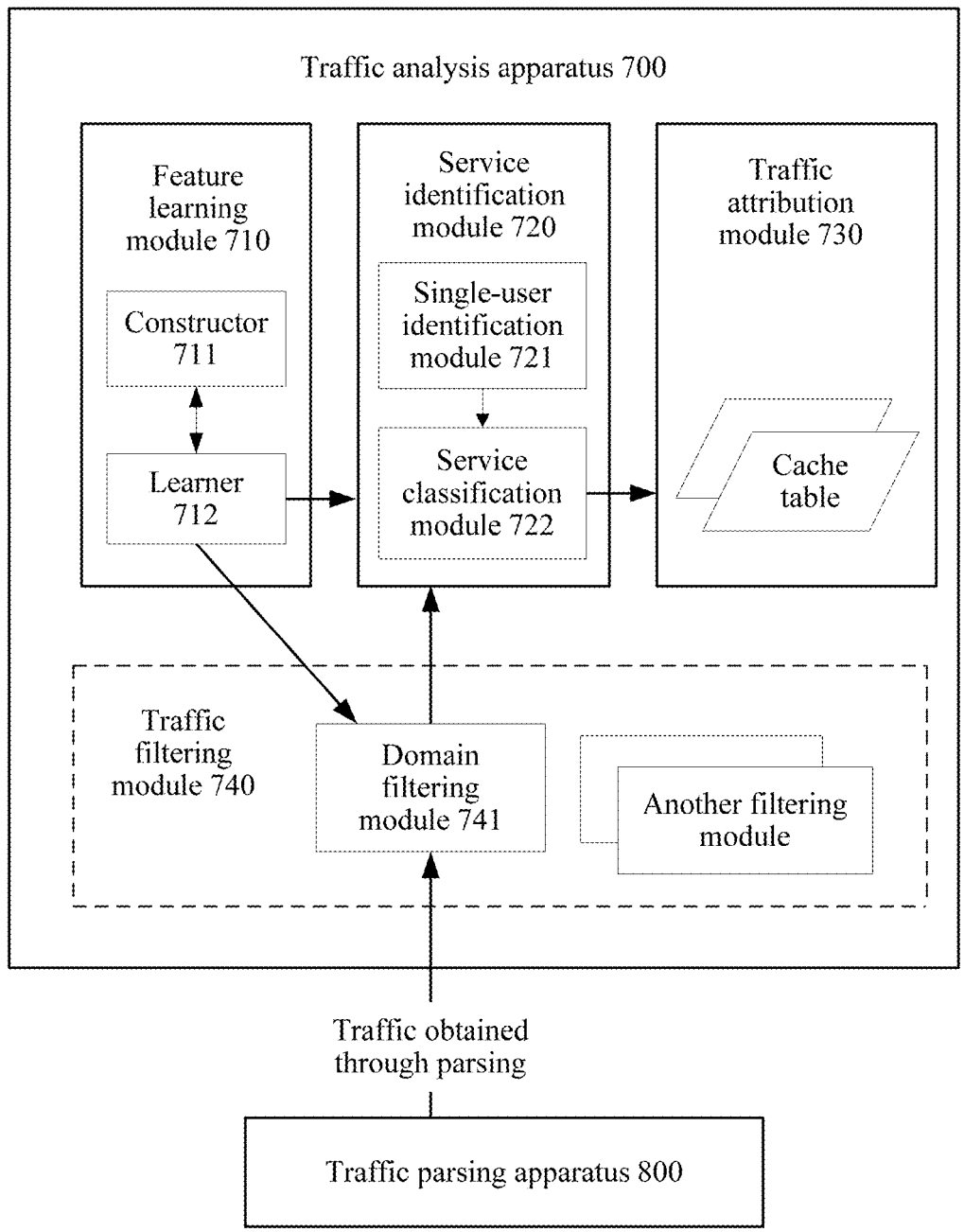
FIG. 7 is a schematic diagram of a logical structure of a traffic analysis apparatus according to an embodiment of this application.

FIG. 7 is a schematic diagram of a logical structure of a traffic analysis apparatus 700 according to an embodiment. The traffic analysis apparatus 700 receives, from a traffic parsing apparatus 800, traffic obtained through parsing, and analyzes the traffic. Specifically, the traffic analysis apparatus 700 includes a feature learning module 710, a service identification module 720, a traffic attribution module 730, and a traffic filtering module 740. The following describes the apparatus with reference to a detailed method.

Figure 8:
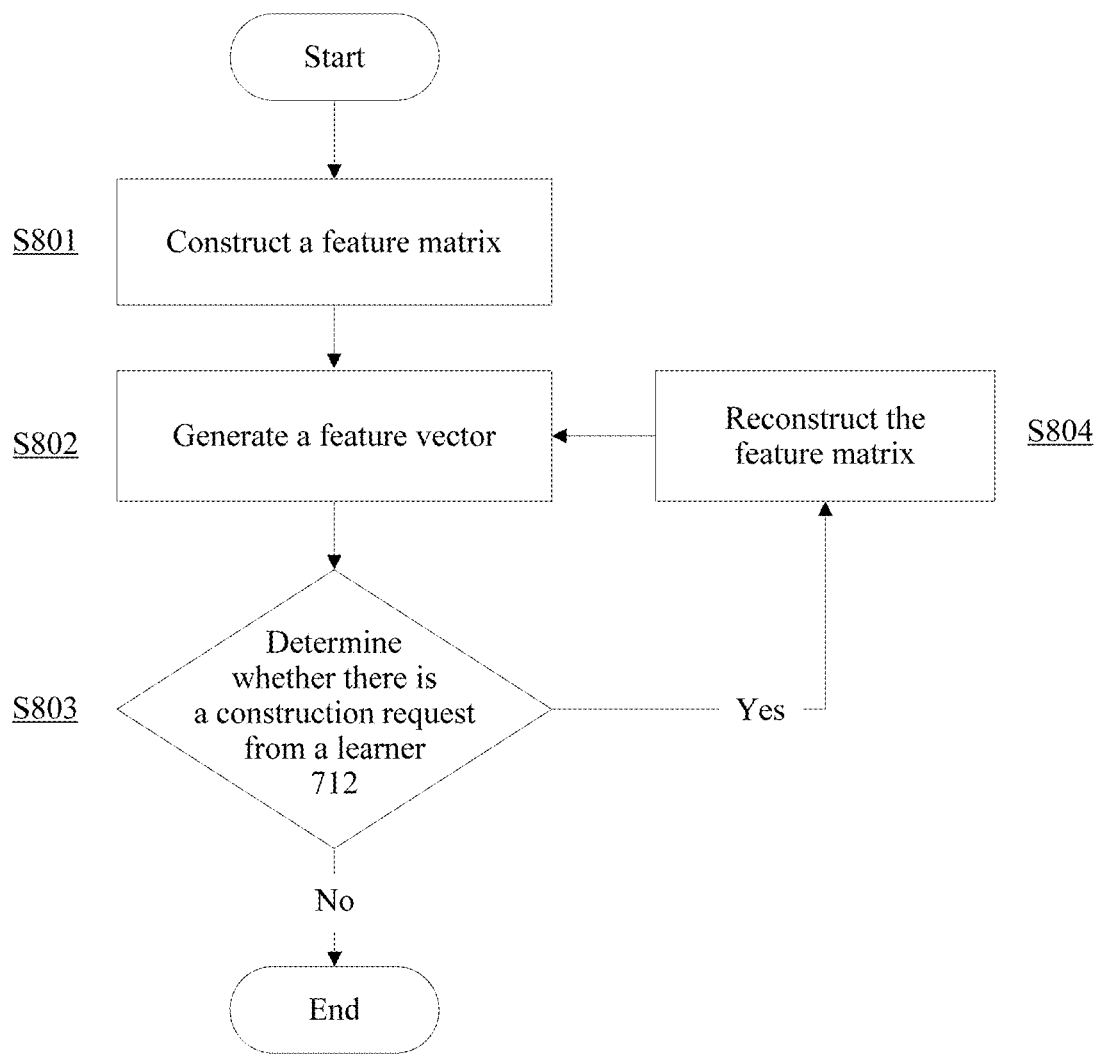
FIG. 8 is a schematic flowchart of a traffic feature construction method according to an embodiment of this application.

FIG. 8 shows a method for determining a feature vector. The method is performed by a constructor 711 of the feature learning module 710. First, the constructor 711 constructs a feature matrix (S801), and each column is a feature.

The feature matrix may be constructed by using one or more of the following three methods. Method 1: The feature matrix is constructed based on a plaintext of a packet. For example, an SNI (server name indication) field in a ClientHello packet is used as a column of features. Method 2: The feature matrix is constructed based on a ciphertext feature of a protocol, for example, a length of a first data packet of uplink application data and/or a length of a downlink data packet, and ciphertext content does not need to be obtained. Method 3: The feature matrix is constructed by combining a plaintext and a ciphertext. The feature matrix may be manually constructed for the first time. In a subsequent step, the feature matrix may be adjusted based on a learned feature value range.

After the feature matrix is obtained, the feature vector is generated (S802). Specifically, a feature of each data stream in application traffic is checked. If the data stream includes the feature in a corresponding feature column, the data stream is marked as 1; or if the feature does not appear, the data stream is marked as 0. In this way, a feature matrix of all data streams can be finally obtained, and each row of the matrix represents a feature vector of a data stream. For example, if application traffic of Google Map includes 20 data streams and there are 30 constructed feature columns, a 20×30 feature matrix including 0 and 1 is output.

Figure 9:
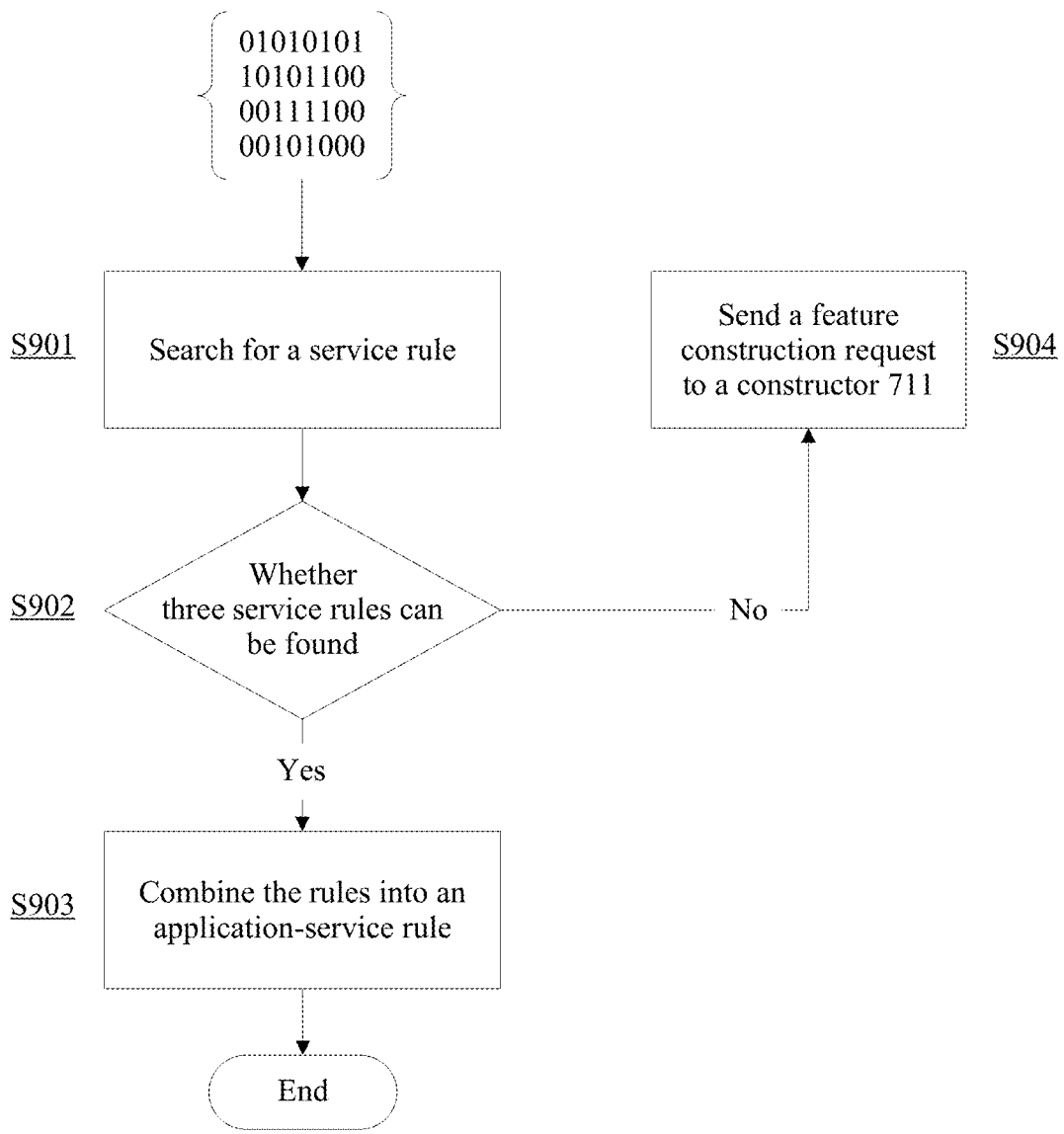
FIG. 9 is a schematic flowchart of learning a service identification rule or an application identification rule according to an embodiment of this application.

FIG. 9 shows a method for obtaining an application-service rule based on a feature vector by using a machine learning algorithm. The method is performed by a learner 712 of the feature learning module 710. The learner 712 obtains the feature vector from the constructor 711, searches, based on the machine learning algorithm, for the feature vector that can be used to distinguish between services, searches for a feature column and a feature value that correspond to the feature vector of the service, and converts a search result into a rule (or referred to as a service identification rule) used to identify the service (S901). Specifically, three types of identification rules are found: the first identification rule, the second identification rule, and the third identification rule, and the three types of identification rules respectively correspond to a start service identification rule, an exclusive service identification rule, and a common service identification rule mentioned in the foregoing embodiment.

When the learner 712 finds a feature vector used to distinguish between services (S902), the learner 712 outputs an identification rule corresponding to the feature vector, and combines a service identification rule learned for a same type of application into the application-service rule of the application (S903). When the learner 712 does not find a feature vector used to distinguish between services (S902), the learner 712 sends, to the constructor, a request for reconstructing the feature matrix (S904), to request to reconstruct the feature matrix. Referring to FIG. 8, after the constructor 711 determines that the request is received (S803), the feature matrix is reconstructed by using some predetermined methods (S804). For example, ciphertext features (such as digital features) are segmented in equal lengths, then the feature matrix is reconstructed based on a segmentation result, and the feature vector is re-output. The steps shown in FIG. 8 and FIG. 9 are iterated until the application-service rule is output.

In this embodiment, the machine learning algorithm such as a decision tree algorithm, an artificial neural network algorithm, a support vector machine algorithm, a clustering algorithm, a Bayes classification algorithm, a Markov chain algorithm, or a probabilistic graphical model may be used.

The rule includes three types: a first identification rule, a second identification rule, and a third identification rule. As shown in Table 3 to Table 5 below, a rule includes one or more fields.

It should be noted that the "field" in Table 3 to Table 5 indicates a field in the rule and is customized. "Location" is a field in an actual data packet. The field is usually agreed on by an Internet Protocol team, and is visible in a Request For Comments (RFC) document of a corresponding protocol and is a consensus in the art. A value may be obtained by using the field, to match a preset value of the field in the rule.

TABLE 3

|  | Field | Location | Description | Example |
| --- | --- | --- | --- | --- |
| First identification rule | SNI | TLS handshake | The field is a server name. | "clients4.google.com" |
|  | TLS record | TLS record length | Packet length feature | For example, a first packet record length 254 may be determined as a start of Google Map. |

An example of the first identification rule is as follows:
SNI=www.googleapis.com && TLS record=512

When the rule is used, a value is obtained from a TLS handshake field of a received data packet, and a value is obtained from a TLS record length field, to perform matching between the two values and the identification rule. It is determined whether the two obtained values are respectively www.googleapis.com and 512. If yes, the matching succeeds; or if no, the matching fails. A method for using another rule in the following is similar to that for the foregoing rule, and details are not described.

TABLE 4

| | Field | Location | Description | Example |
|---|---|---|---|---|
| Second identification rule | SNI | TLS handshake | The field is a server name. | "clients4.google.com" |
| | CertCommonName | Certificate | Certificate alias | "blackberry.com" |
| | UserAgent | HTTP head | Browser and system name (single-packet identification) | "com.google.android.youtube" |
| | UDP-UserAgent | HTTP head | Browser and system name (single-packet identification) | "com.google.android.youtube" |
| | Client application data (cAppD) | TLS record length | Data sent by a client to a server side (Considering packet fragmentation and performance, the field may be replaced with TCP.length.) | 0-1300 (sequential matching in a same direction, and supporting TCP and TLS packets) |
| | Server application data (sAppD) | TLS record length | Data sent by a server side to a client (Considering packet fragmentation and performance, the field may be replaced with TCP.length.) | 0-1300 (a maximum of four packets matched in this direction, sequential matching in a same direction, and TCP and TLS packets) |
| | Other | TLS handshake | Another possible handshake feature | Existing TLS identification (fingerprint) rule |

An example of the second identification rule is as follows:

iOS® system: SNI=clients4.google.com && sAppD[1]==62 && sAppD[2]==42 && sAppD[3]==38 && sAppD[4]>=242 && sAppD[4]<=243 && cAppD[1]==53 && cAppD[2]==50 && cAppD[3]>=301 && cAppD[3]<=308; and Android® system: SNI=clients4.google.com && sAppD[1]-376 && nCAppD>=1 && cAppD[1]>=848 && cAppD[1]<=849, where sAppD[x] indicates a length of an $x^{th}$ application data packet sent by the server side to the client side, and cAppD[x] indicates a length of an $x^{th}$ application data packet sent by the client side to the server side.

An example of the third identification rule is as follows:

SNI_googleadservices.com
SNI_www.googleapis.com
CertCommonName_google-analytics.com The foregoing is a process of obtaining a service identification rule, and the process is performed offline. The following describes a real-time traffic analysis process. In the real-time traffic analysis process, the following processes such as a traffic obtaining process, a traffic filtering process, a service identification process, and a process of attributing common service traffic are sequentially performed in real time.

TABLE 5

| | Field | Location | Description | Example |
|---|---|---|---|---|
| Third identification rule | SNI | TLS handshake | The field is a server name (single-packet identification). | "clients4.google.com" |
| | CertCommonName | Certificate | Certificate alias (single-packet identification) | "blackberry.com" |
| | Other | TLS handshake | Another possible handshake feature | Existing TLS identification (fingerprint) rule |

Figure 10:
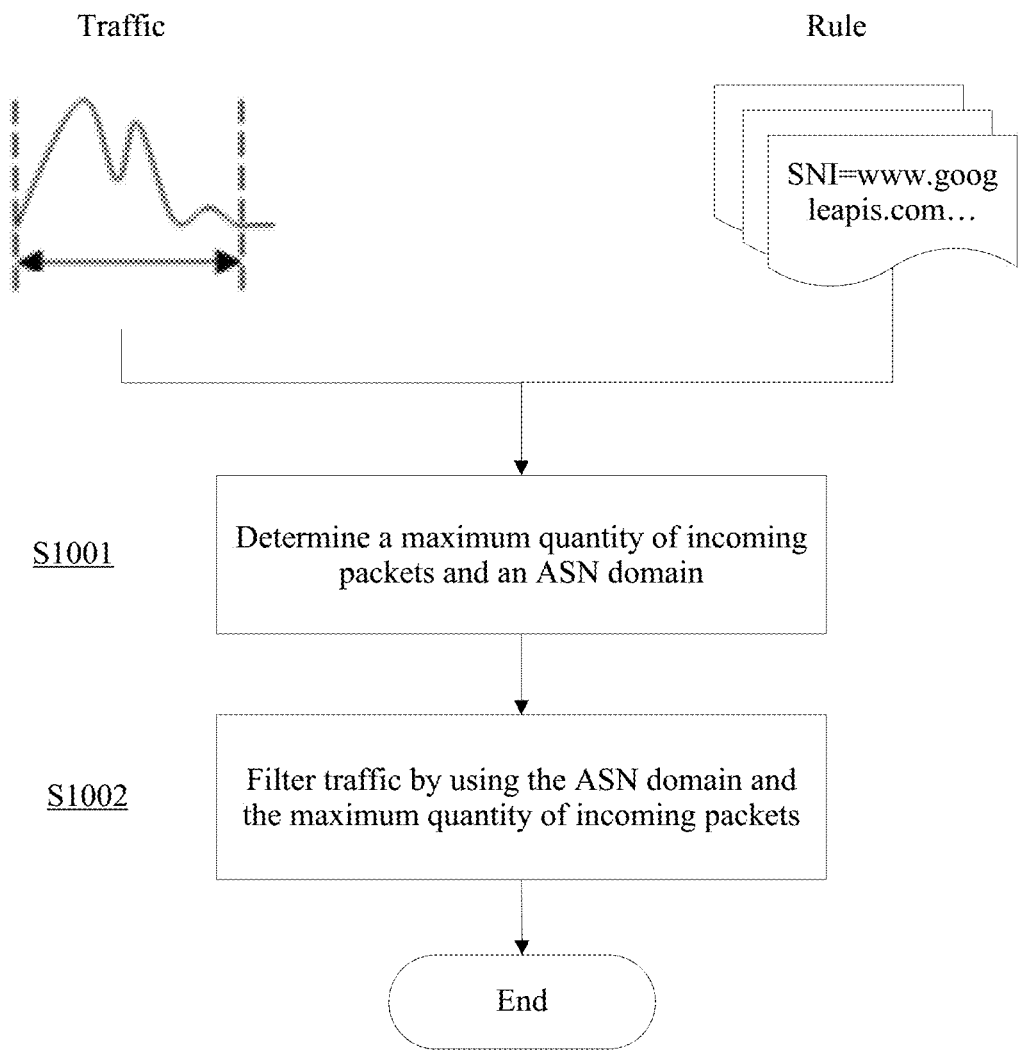
FIG. 10 is a schematic flowchart of a traffic filtering method according to an embodiment of this application.

FIG. 10 shows a traffic filtering method. The method is optional, but can be used to reduce to-be-matched traffic and improve processing efficiency. The method is performed by a domain filtering module 741 in a traffic filtering module 740. Input of the module 741 has two parts. One part is a packet (that is, to-be-filtered traffic) obtained by parsing network traffic by a traffic parsing apparatus 800, and the other part is an application-service rule that is output by a learner 712. Output of the module 741 is traffic obtained through filtering.

In one embodiment, after the application-service rule and the to-be-filtered traffic are received, a maximum quantity of incoming packets required when the rule is used to identify a service is determined according to the application-service rule (S1001). In addition, an ASN domain of Google is calculated based on IP information of the to-be-filtered traffic (S1001). The traffic is filtered based on the determining result and the maximum quantity of incoming packets (S1002), and the traffic obtained through filtering belongs to the ASN domain of Google and meets a requirement for the maximum quantity of incoming packets.

The maximum quantity of incoming packets herein is a maximum quantity of packets that are read by a traffic analysis apparatus 700 from a data stream. For example, if the maximum quantity of incoming packets is 5, a quantity of read packets is less than or equal to 5. If the quantity of read packets exceeds 5, no packet is read. In other words, when the traffic is filtered, other data packets different from the five packets are filtered out.

Figure 11:
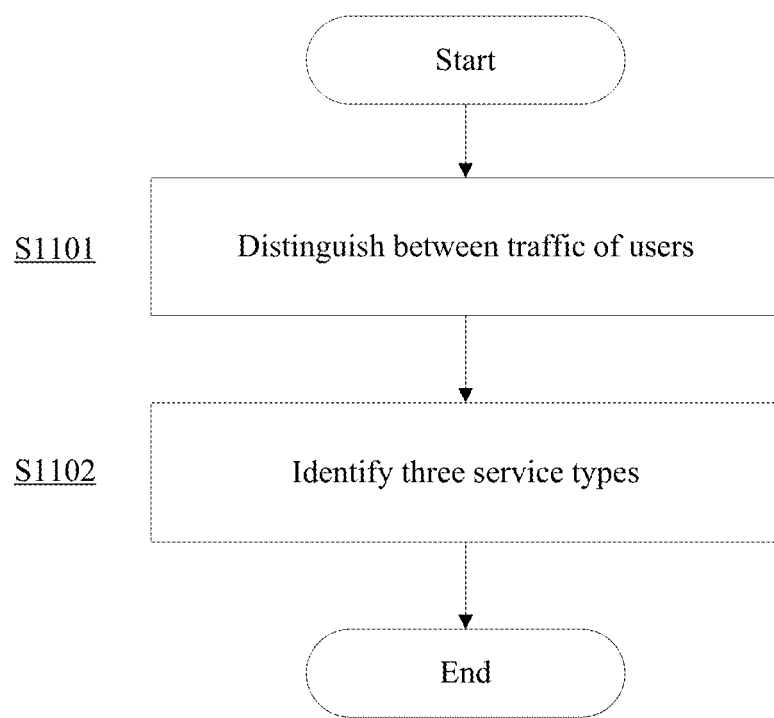
FIG. 11 is a schematic flowchart of identifying three service types according to an embodiment of this application.

FIG. 11 shows a method for performing service identification on traffic obtained through filtering. The method is performed by a service identification module 720. Input is a result of filtering current network traffic by a domain filtering module 741 and an application-service rule that is output by a feature learning module 710; and output is a service classification identification result. First, a single-user identification module 721 distinguishes between application traffic of a single user based on an IP, a session ID, a device ID, a user ID, or other identity identification information in the traffic obtained through filtering, and inputs the application traffic of the single user to a service classification module 722 (S1101). The service classification module 722 identifies a start service, an exclusive service, and a common service of each application in the traffic of the single user according to the application-service rule (S1102), and sends an identification result to a traffic attribution module 730. In the identification process, a packet feature in the traffic of the single user may be extracted for performing matching with an application-service rule one by one. If the matching succeeds, a matching process ends, and a service type and an application that correspond to a rule with which the matching succeeds are output.

It should be noted that, in some other embodiments, the single-user identification module 721 and an execution process of the single-user identification module 721 are not necessary. For example, traffic originally comes from one user, or traffic comes from a plurality of users, but a requirement for a solution does not include distinguishing between traffic of different users.

Figure 12:
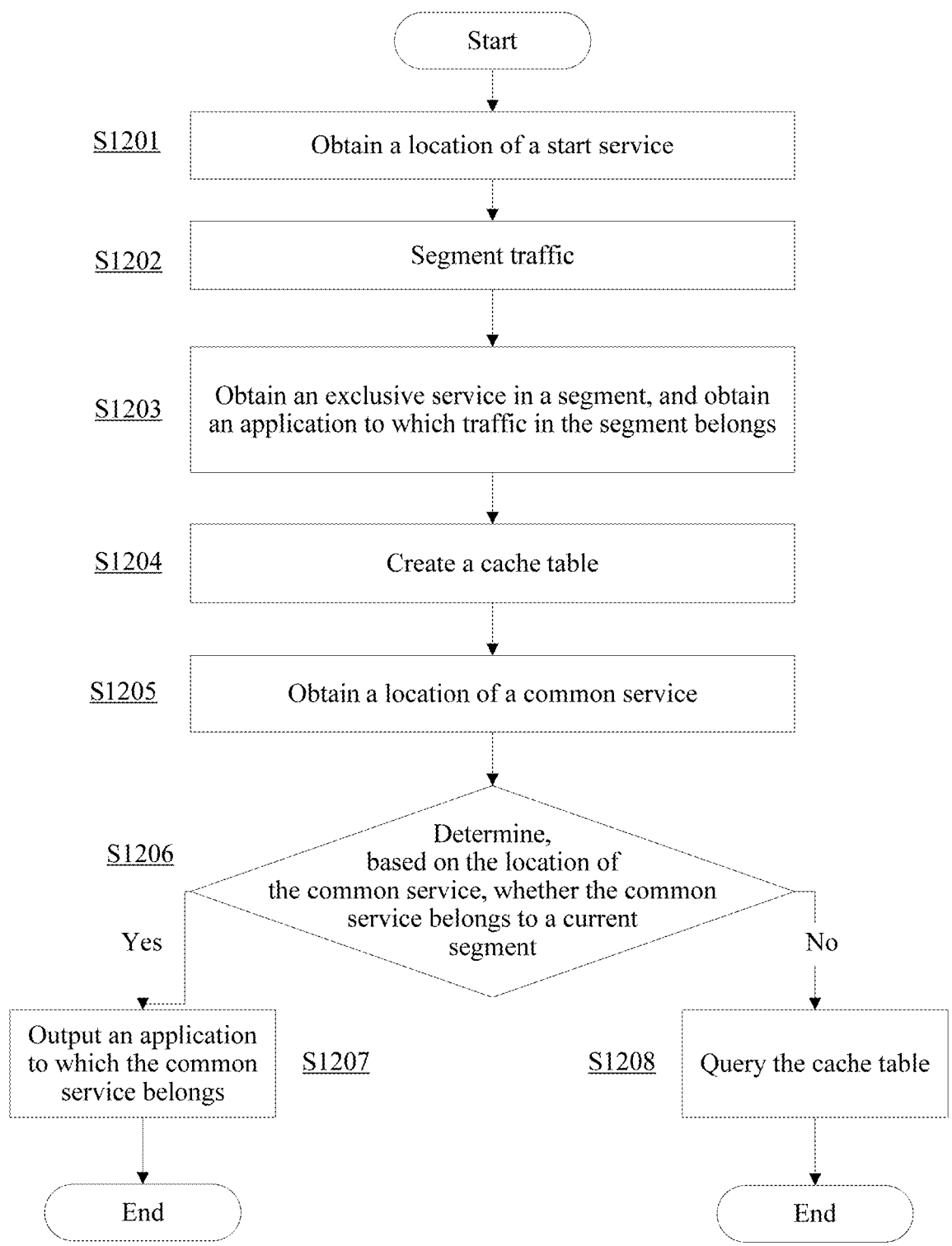
FIG. 12 is a schematic flowchart of a common service traffic attribution method according to an embodiment of this application.

FIG. 12 shows a method for attributing traffic to an application. The method is performed by a traffic attribution module 730. Input of the module is a service identification result for a single user, and output is an application to which traffic of a common service belongs.

In one embodiment, a location of a start service is obtained (S1201), and traffic of a single user is segmented by using the location (S1202). An exclusive service in the segment (namely, a current segment) is obtained, and an application to which traffic in the segment belongs is obtained (S1203). The application is an application that invokes the exclusive service. Then a cache table is established, and information recorded in the cache table includes an application ID, a user ID, and a location of a start service that correspond to the segment (S1204).

To save storage space, only application IDs, user IDs, and location information of start services that correspond to a previous segment and the current segment are stored in the cache table.

It should be understood that the cache table is a table stored in a cache in a form of a table. In some other embodiments, the information may also be stored in another storage space in another form.

If a previous module identifies a common service, a location of the identified common service is obtained (S1205). It is determined, based on the location of the common service, whether the common service belongs to the current segment (S1206); and if the common service belongs to the current segment, an application to which the common service belongs is output (S1207); or if the common service does not belong to the current segment, the cache table is queried for application information of a corresponding location by using the location information of the user (S1208), and the application to which the common service belongs is output Alternatively, the cache table is directly queried for application information of a corresponding location based on the location of the common service, and an application to which the common service belongs is output.

It should be noted that an ID of an entry in this embodiment is information used to identify the entry, and may be a digit, a text, code, or information of another type. In this embodiment, a location of a service is a time at which the service is identified. Refer to a start location of an arrow that indicates a service in FIG. 6.

Any method provided in the foregoing embodiments may be implemented on one or more physical computers. The apparatus proposed in the foregoing embodiments may be deployed on one or more physical computers. Unit module division inside the apparatus is merely shown as an example, and all unit modules may be deployed on a same physical computer, or may be deployed on different physical computers.

Figure 13:
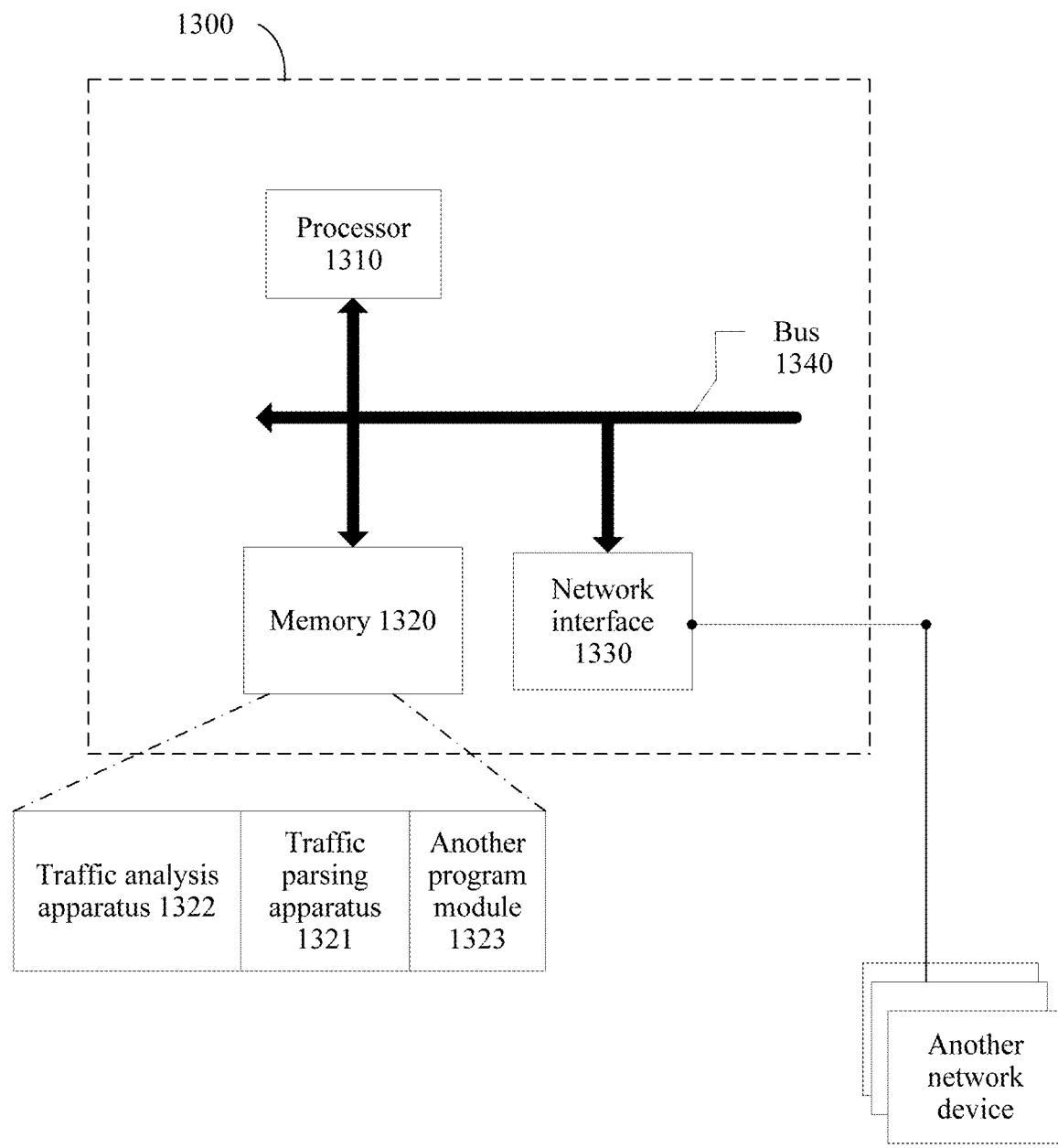
FIG. 13 is a schematic diagram of a logical structure of a computer system according to an embodiment of this application.

FIG. 13 is a schematic diagram of a logical structure of a computer system according to an embodiment. The computer system may be any type of computer system, such as a network device (for example, a DPI device), a server, a mobile terminal, a personal computer, or an in-vehicle computer. The computer system 1300 includes components such as a processor 1310, a memory 1320, and a network interface 1330 (which is also referred to as a network interface card, a network adapter, or the like). The computer system and another device may be interconnected to implement more functions, for example, traffic charging.

The processor 1310 may be a single-core processor or a multi-core processor. When the processor 1310 is the multi-core processor, the method provided in this application may run on one core, or may run on different cores in a distributed manner. There may be one or more processors 1310, and the plurality of processors may be of a same type or different types. The processor types include a central processing unit (CPU), a graphics processing unit, a microprocessor, a coprocessor, and the like.

The network interface 1330 is configured to connect to another network device, and the connection includes a wireless connection and a wired connection. In this embodiment, the network interface 1330 may be configured to obtain traffic from a network to perform traffic parsing or traffic analysis.

The memory 1320 includes a volatile memory and a nonvolatile memory. Usually, the nonvolatile memory stores a computer readable instruction of a traffic analysis apparatus 1322 and/or a traffic parsing apparatus 1321 provided in this application, and may further store a computer readable instruction of another program module 123 (for example, an operating system). After these computer readable instructions are read and run by the processor 1310, any one or more methods provided in the foregoing embodiments of this application may be implemented. For specific implementation of the traffic analysis apparatus 1322 and the traffic parsing apparatus 1321, refer to the foregoing embodiments. In another embodiment, the traffic analysis apparatus 1322 and the traffic parsing apparatus 1321 may be separately deployed on different physical computers.

The foregoing components are connected by using a bus 140. There may be one or more buses 140. The bus 140 includes an advanced microcontroller bus architecture (AMBA) industry standard architecture (ISA) bus, a micro channel architecture (MCA) bus, an extended ISA (extended-ISA) bus, a Video Electronics Standards Association (VESA) local bus, a peripheral component interconnect (PCI) bus, and the like.

The traffic analysis method provided in this application is different from a prior-art TLS handshake solution used only for application identification, and this application provides more fine-grained service identification. A ciphertext feature of a packet is used in a service identification process, thereby improving service identification accuracy. Correspondingly, in a rule learning process, ciphertext feature learning is added. Under impact of a ciphertext feature (for example, a length, a sequence, or a transmission direction of an application data packet) on service identification, a feature matrix is constructed, a feature vector is learned, and finally an application-service rule is generated, so that an identification granularity is increased, thereby resolving a problem that some TLS handshake features are insufficient to distinguish between and identify traffic. Further, according to the traffic analysis method provided in this application, a feature of an encrypted HTTP session part is combined with a TLS handshake plaintext feature, and the feature vector is learned by using an adaptive binning method that combines a numeric feature and a symbol feature, so as to identify application or service traffic, and improve identification accuracy and precision.

According to the common service traffic attribution method provided in this application, an attribution problem is resolved through collaboration of three services; a traffic segment is located by using a start service; an application label is obtained by using an exclusive service; and common service traffic is attributed by using segment information, thereby resolving a problem that common service traffic cannot be attributed to an application.

This application further provides a filtering method that is based on a maximum quantity of incoming packets and an ASN domain of traffic, so as to reduce traffic that needs to be analyzed. In addition, in a rule generation process, efficiency is considered, redundant rules are combined, and a quantity of determining times is reduced. Therefore, a problem that rule complexity is excessively high and performance seriously deteriorates is resolved. In a TLS handshake rule, a full procedure field of a certificate needs to be parsed, and a large amount of memory is consumed. A single field cannot be accurately matched, and consequently identification overheads are increased. A parsed field needs to be optimized, and rule complexity needs to be reduced. An effect of the filtering method provided in this application lies in that a filtering policy is adaptively adjusted based on a parameter provided by an identification rule; impact imposed by a redundant rule on performance is reduced; a filtering module is designed; a quantity of reading times and performance overheads are reduced; a disadvantage of a full-field feature establishment rule in a current technical solution is overcome; and a high-speed real-time traffic identification environment is adapted.

In a high-speed environment of a backbone core network, a quantity of packets required for traffic identification is greatly limited. Therefore, in the description process in this application, no full-traffic feature is applied. However, if hardware technologies progress or any special construction environment can support this feature learning manner, this application can be naturally extended to this traffic identification environment. A core identification step is still similar to that in the foregoing embodiments of this application, and a difference is readily figured out by a person skilled in the art. In addition, random packaging of the TLS protocol, or the lower-level TCP protocol, or a manually constructed proprietary protocol may partially change a feature value during identification, and this solution still falls within the protection scope of this application.

The technical solutions provided in this application may be applied to a policy and charging control scenario of an operator, and may be further applied to a video key quality indicator (key quality indicator, KQI) scenario, for example, a content delivery network (content delivery network, CDN) traffic distinguishing scenario. In this scenario, common traffic is generated for a reason similar to that in the foregoing embodiments, and attribution of common traffic used by different applications in a CDN may be basically identified and distinguished according to the method provided in the foregoing embodiments, so as to accurately complete a video KQI statistics collection requirement. More broadly, the solutions provided in this application are applicable to any scenario in which common traffic generated by a common service needs to be distinguished.

It should be noted that the module or unit division in the foregoing embodiments is only shown as an example, and functions of the described modules are merely described as an example. This application is not limited thereto. A person of ordinary skill in the art may combine functions of two or more modules according to a requirement, or divide functions of one module to obtain more modules with a finer granularity, or there may be other variants.

For same or similar parts of the embodiments described above, mutual reference may be made to the embodiments.

The described apparatus embodiments are merely examples. The modules described as separate parts may or may not be physically separated, and parts shown as modules may or may not be physical modules, may be located in one position, or may be distributed on a plurality of network modules. Some or all of the modules may be selected according to actual needs to achieve the objectives of the solutions of the embodiments. In addition, in the accompanying drawings of the apparatus embodiments provided in this application, connection relationships between modules indicate that the modules have communication connections to each other, and may be specifically implemented as one or more communications buses or signal cables. A person of ordinary skill in the art may understand and implement the embodiments of this application without creative efforts.

The foregoing descriptions are merely specific implementations of this application, but are not intended to limit the protection scope of this application.

What is claimed is:

1. A common service traffic attribution method, comprising:
   determining, according to an identification rule, a maximum quantity of incoming packets required for a traffic analysis, wherein the identification rule is obtained based on a feature by using a machine learning algorithm to identify different services in traffic;
   filtering the traffic based on the maximum quantity of incoming packets;
   obtaining a feature of a packet in the traffic, wherein the feature comprises a ciphertext feature having one or more of a sequence, a length, or a transmission direction of an encrypted packet;
   analyzing the traffic based on the feature, to identify a start service, an exclusive service, and a common service in the traffic, wherein the start service is a service invoked in an application startup phase, the exclusive service is a service invoked by only one application, and the common service is a service invoked by a plurality of applications; and
   attributing traffic of a common service whose identification time is between a first identification time of a start service A and a second identification time of a start service B to an application that invokes an exclusive service whose identification time is between the first identification time and the second identification time, wherein the start service A is any identified start service, and the start service B is a first start service whose identification time is after the first identification time.

2. The method according to claim 1, before the obtaining the feature, further comprising:
   filtering the traffic based on Internet Protocol (IP) information of the traffic.

3. The method according to claim 1, wherein analyzing the traffic comprises:
   performing matching between the feature and each of a first identification rule, a second identification rule, and a third identification rule to identify the start service, the exclusive service, and the common service in the traffic, wherein the first identification rule, the second identification rule, and the third identification rule are obtained based on the feature by using a machine learning algorithm.

4. The method according to claim 1, wherein attributing traffic of a common service comprises:
   determining the application based on the exclusive service and correspondence information, wherein the correspondence information comprises a correspondence between the exclusive service and an application that invokes the exclusive service.

5. The method according to claim 1, wherein the feature further comprises a plaintext feature, and the plaintext feature comprises a feature comprising a character and/or a digit that can be directly obtained from the packet through parsing.

6. A common service traffic attribution method, comprising:
   determining, according to an identification rule, a maximum quantity of incoming packets required for a traffic analysis, wherein the identification rule is obtained based on a feature by using a machine learning algorithm to identify different services in traffic;
   filtering the traffic based on the maximum quantity of incoming packets;
   obtaining a feature of a packet in the traffic, wherein the feature comprises a ciphertext feature, and the ciphertext feature comprises any one or more of a sequence, a length, or a transmission direction of an encrypted packet;
   analyzing the traffic based on the feature, to identify an exclusive service and a common service in the traffic, wherein the exclusive service is a service invoked by only one application, and the common service is a service invoked by a plurality of applications; and
   attributing traffic of a common service whose identification time is between an identification time of an exclusive service A and an identification time of an exclusive service B to an application, wherein the application is an application that invokes the exclusive service A, the exclusive service A is any identified exclusive service, and the exclusive service B is a first exclusive service whose identification time is after the identification time of the exclusive service A.

7. The method according to claim 6, wherein the analyzing the traffic based on the feature, to identify an exclusive service and a common service in the traffic comprises:
   performing matching between the feature and each of a second identification rule and a third identification rule to identify the exclusive service and the common service in the traffic, wherein the second identification rule and the third identification rule are obtained based on the feature by using a machine learning algorithm.

8. A computer system, comprising a memory and a processor, wherein the memory is configured to store a computer readable instruction, which when executed by the processor, causes the processor to perform a common service traffic attribution method, the method comprising:
   determining, according to an identification rule, a maximum quantity of incoming packets required for a traffic analysis, wherein the identification rule is obtained based on a feature by using a machine learning algorithm to identify different services in traffic; and
   filtering the traffic based on the maximum quantity of incoming packets;
   obtaining a feature of a packet in the traffic, wherein the feature comprises a ciphertext feature, and the ciphertext feature comprises any one or more of a sequence, a length, or a transmission direction of an encrypted packet;
   analyzing the traffic based on the feature, to identify a start service, an exclusive service, and a common service in the traffic, wherein the start service is a service invoked in an application startup phase, the exclusive service is a service invoked by only one application, and the common service is a service invoked by a plurality of applications; and
   attributing traffic of a common service whose identification time is between a first identification time of a start service A and a second identification time of a start service B to an application that invokes an exclusive service whose identification time is between the first identification time and the second identification time, the start service A is any identified start service, and the start service B is a first start service whose identification time is after the first identification time.

9. The computer system according to claim 8, wherein analyzing the traffic comprises:
   performing matching between the feature and each of a first identification rule, a second identification rule, and a third identification rule to identify the start service, the exclusive service, and the common service in the traffic, wherein the first identification rule, the second identification rule, and the third identification rule are obtained based on the feature by using a machine learning algorithm.

10. The computer system according to claim 8, wherein attributing traffic of a common service comprises:
determining the application based on the exclusive service and correspondence information, wherein the correspondence information comprises a correspondence between the exclusive service and an application that invokes the exclusive service.

11. A computer system, comprising a memory and a processor, wherein the memory is configured to store a computer readable instruction, which when executed by the processor, causes the processor to perform a common service traffic attribution method, comprising:
determining, according to an identification rule, a maximum quantity of incoming packets required for a traffic analysis, wherein the identification rule is obtained based on a feature by using a machine learning algorithm, and the identification rule is used to identify different services in traffic;
filtering the traffic based on the maximum quantity of incoming packets;
obtaining a feature of a packet in the traffic, wherein the feature comprises a ciphertext feature, and the ciphertext feature comprises any one or more of a sequence, a length, or a transmission direction of an encrypted packet;
analyzing the traffic based on the feature, to identify an exclusive service and a common service in the traffic, wherein the exclusive service is a service invoked by only one application, and the common service is a service invoked by a plurality of applications; and
attributing traffic of a common service whose identification time is between an identification time of an exclusive service A and an identification time of an exclusive service B to an application that invokes the exclusive service A, the exclusive service A is any identified exclusive service, and the exclusive service B is a first exclusive service whose identification time is after the identification time of the exclusive service A.

12. The computer system according to claim 11, wherein the analyzing the traffic based on the feature, to identify an exclusive service and a common service in the traffic comprises:
performing matching between the feature and each of a second identification rule and a third identification rule to identify the exclusive service and the common service in the traffic, wherein the second identification rule and the third identification rule are obtained based on the feature by using a machine learning algorithm.

13. A non-transitory computer-readable medium storing computer instructions for common service traffic attribution, that when executed by one or more processors, cause the one or more processors to perform a method, which comprises:
determining, according to an identification rule, a maximum quantity of incoming packets required for a traffic analysis, wherein the identification rule is obtained based on a feature by using a machine learning algorithm to identify different services in traffic; and
filtering the traffic based on the maximum quantity of incoming packets;
obtaining a feature of a packet in the traffic, wherein the feature comprises a ciphertext feature, and the ciphertext feature comprises any one or more of a sequence, a length, or a transmission direction of an encrypted packet;
analyzing the traffic based on the feature, to identify a start service, an exclusive service, and a common service in the traffic, wherein the start service is a service invoked in an application startup phase, the exclusive service is a service invoked by only one application, and the common service is a service invoked by a plurality of applications; and
attributing traffic of a common service whose identification time is between a first identification time of a start service A and a second identification time of a start service B to an application that invokes an exclusive service whose identification time is between the first identification time and the second identification time, wherein the start service A is any identified start service, and the start service B is a first start service whose identification time is after the first identification time.

14. The medium according to claim 13, wherein the analyzing the traffic comprises:
performing matching between the feature and each of a first identification rule, a second identification rule, and a third identification rule to identify the start service, the exclusive service, and the common service in the traffic, wherein the first identification rule, the second identification rule, and the third identification rule are obtained based on the feature by using a machine learning algorithm.

15. The medium according to claim 13, wherein attributing traffic of a common service comprises:
determining the application based on the exclusive service and correspondence information, wherein the correspondence information comprises a correspondence between the exclusive service and an application that invokes the exclusive service.

* * * * *